(12) United States Patent
Brulo et al.

(10) Patent No.: US 11,922,789 B2
(45) Date of Patent: Mar. 5, 2024

(54) SYSTEMS AND METHODS FOR MACHINE PLACEMENT

(71) Applicant: Oshkosh Corporation, Oshkosh, WI (US)

(72) Inventors: Gregory S. Brulo, Oshkosh, WI (US); Korry D. Kobel, Oshkosh, WI (US); Brian K. Mohlman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/556,541

(22) Filed: Dec. 20, 2021

(65) Prior Publication Data

US 2022/0198905 A1 Jun. 23, 2022

Related U.S. Application Data

(60) Provisional application No. 63/225,236, filed on Jul. 23, 2021, provisional application No. 63/128,499, filed on Dec. 21, 2020.

(51) Int. Cl.

| | | |
|---|---|---|
| *G08B 21/18* | (2006.01) | |
| *G06F 3/04842* | (2022.01) | |
| *G06F 3/0488* | (2022.01) | |
| *G08B 5/22* | (2006.01) | |
| *B66F 17/00* | (2006.01) | |
| *G01S 1/04* | (2006.01) | |
| *G01S 17/08* | (2006.01) | |

(52) U.S. Cl.
CPC ......... *G08B 21/18* (2013.01); *G06F 3/04842* (2013.01); *G06F 3/0488* (2013.01); *G08B 5/22* (2013.01); *B66F 17/006* (2013.01); *G01S 1/0423* (2019.08); *G01S 17/08* (2013.01)

(58) Field of Classification Search
CPC ....... G08B 21/18; G08B 5/22; G06F 3/04842; G06F 3/0488; B66F 17/006; B66F 9/0655; B66F 9/0755; B66F 11/04; G01S 1/0423; G01S 17/08; G01S 7/4808; G01S 17/88; G01S 17/42; B66C 23/905; G01C 3/04

See application file for complete search history.

(56) References Cited

U.S. PATENT DOCUMENTS

| | | | |
|---|---|---|---|
| 10,410,124 B1 * | 9/2019 | Zhou | G06N 5/04 |
| 2011/0021293 A1 * | 1/2011 | York | A63B 71/06 |
| | | | 473/409 |
| 2014/0063261 A1 | 3/2014 | Betensky et al. | |

FOREIGN PATENT DOCUMENTS

| | | | | |
|---|---|---|---|---|
| EP | 2 543 622 A1 | 1/2013 | | |
| EP | 3 495 316 A1 | 6/2019 | | |
| EP | 3495316 A1 * | 6/2019 | ............ | B66F 17/003 |

* cited by examiner

*Primary Examiner* — Brian Wilson
(74) *Attorney, Agent, or Firm* — Foley & Lardner LLP

(57) ABSTRACT

A reach and placement tool includes an eyepiece, an orientation sensor, a distance sensor, and a controller. The controller is configured to obtain a distance value and an orientation from the distance sensor and the orientation sensor when the reach and placement tool is directed towards a point of interest at a particular location. The controller is also configured to determine a coordinate of the point of interest using the distance value and the orientation, and compare the coordinate of the point of interest to a reach envelope to determine if the point of interest is within range of a particular reach apparatus.

19 Claims, 27 Drawing Sheets

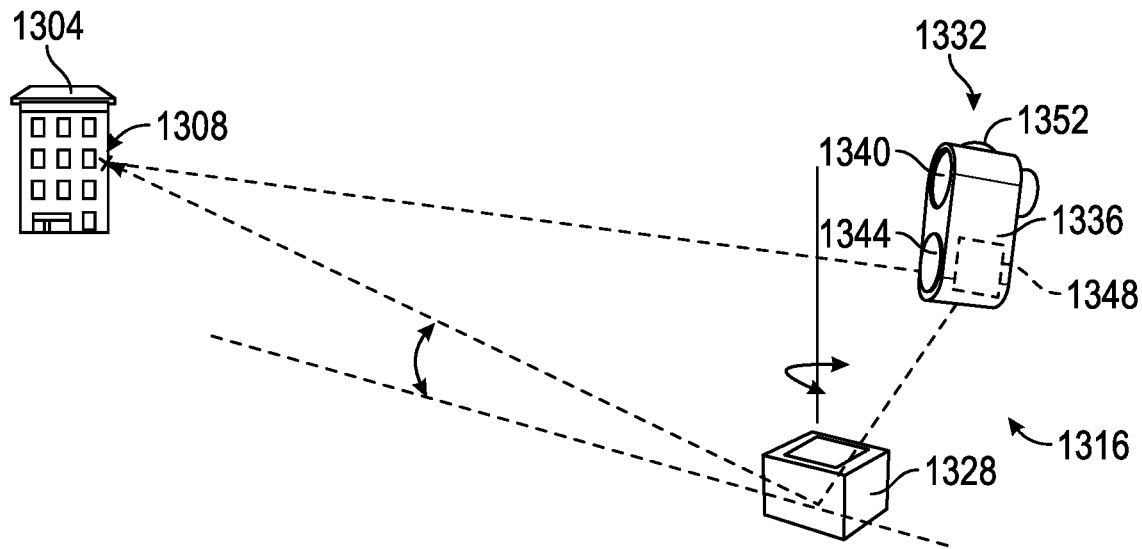
FIG. 18
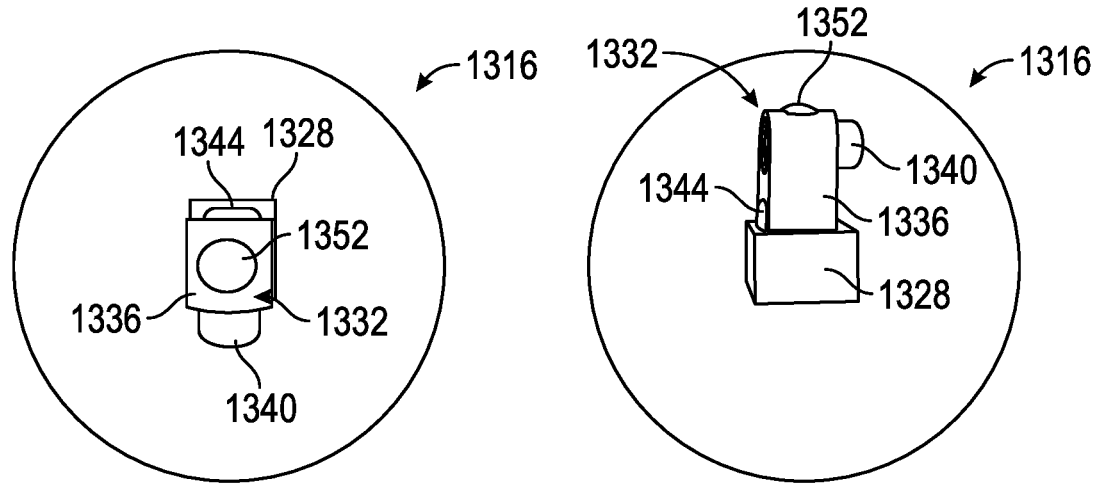
FIG. 19     FIG. 20

| Color / Pattern | Description |
|---|---|
| Off | Power Off |
| Green Solid | In Cradle, Ready for User to Remove from Cradle |
| Yellow Solid | In Cradle, Basket Moving, Not Ready |
| Green Blink Slow | Out of Cradle, Ready for User to Press Measure Button |
| Red | Out of Cradle, Time Expired or IMU Out of Range, User Needs to Return to Cradle |
| Green Blink Fast | Measurement Successful |
| Red Blink Fast | Measurement not Successful, User Needs to Return to Cradle |

FIG. 23

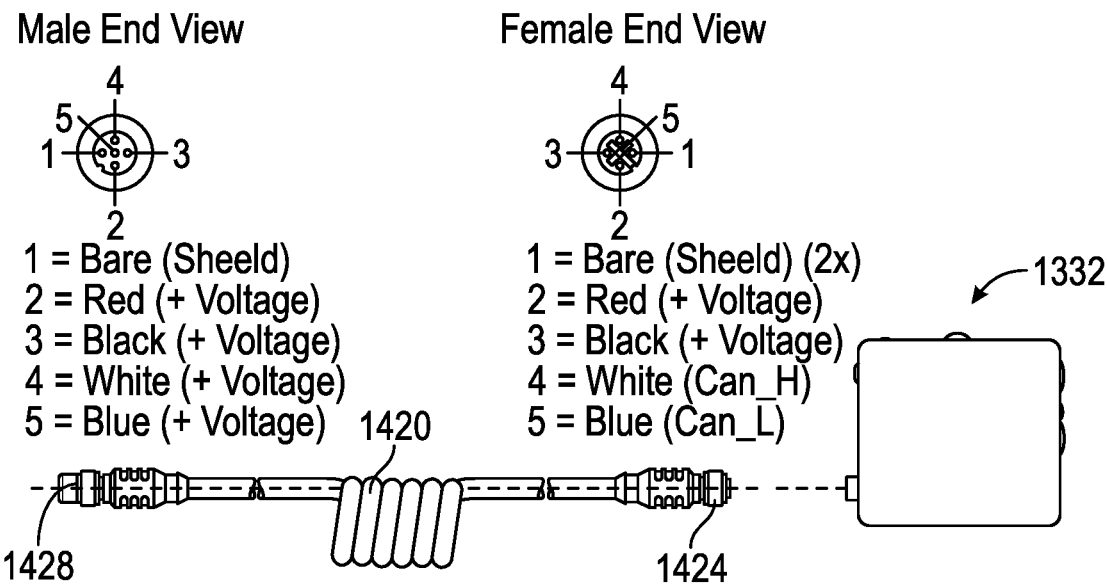

FIG. 24

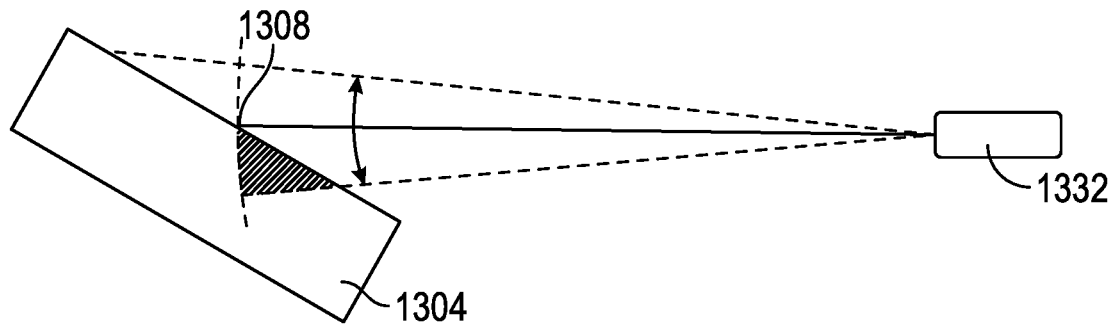

FIG. 25

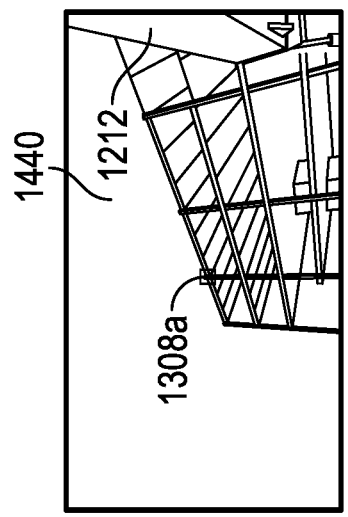
FIG. 28A
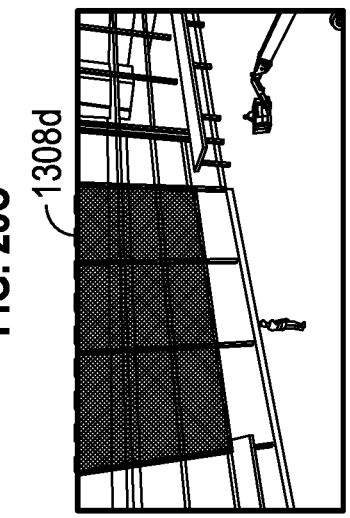
FIG. 28B
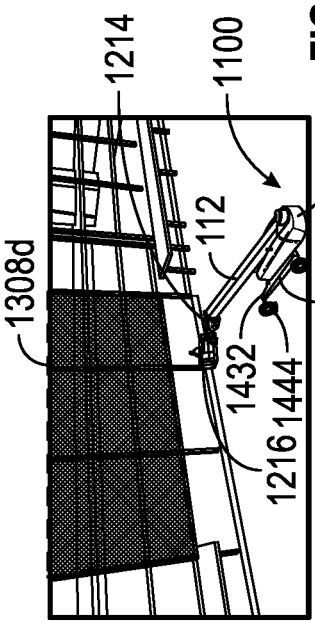
FIG. 28C
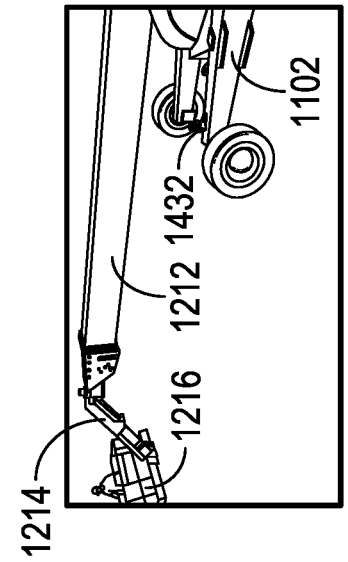
FIG. 28D
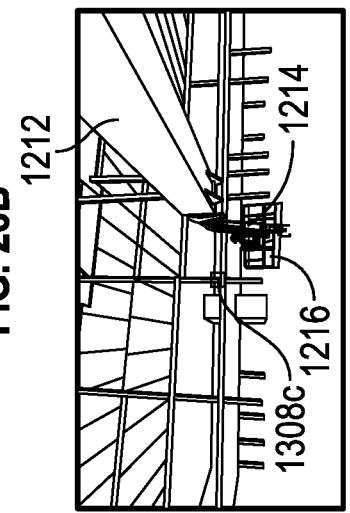
FIG. 28E
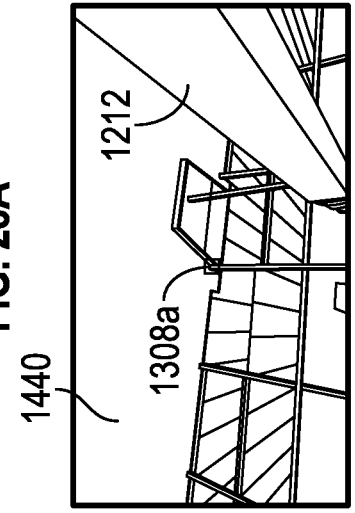
FIG. 28F
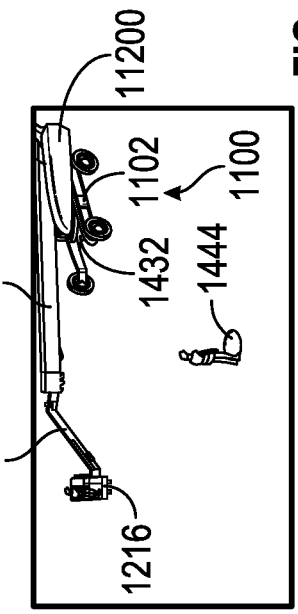
FIG. 28G
FIG. 28H

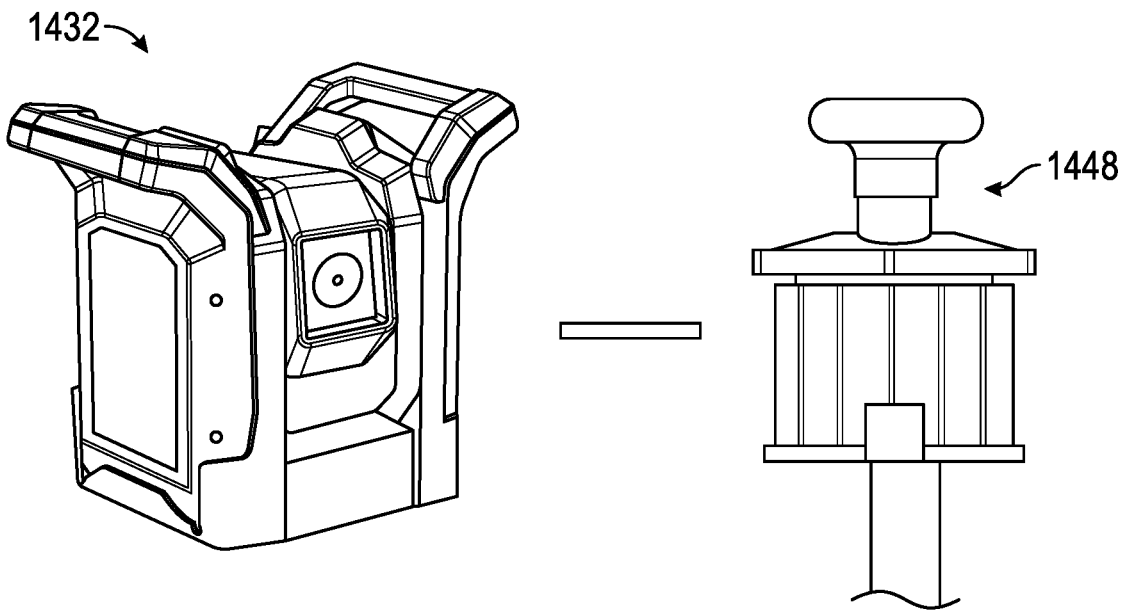
FIG. 29
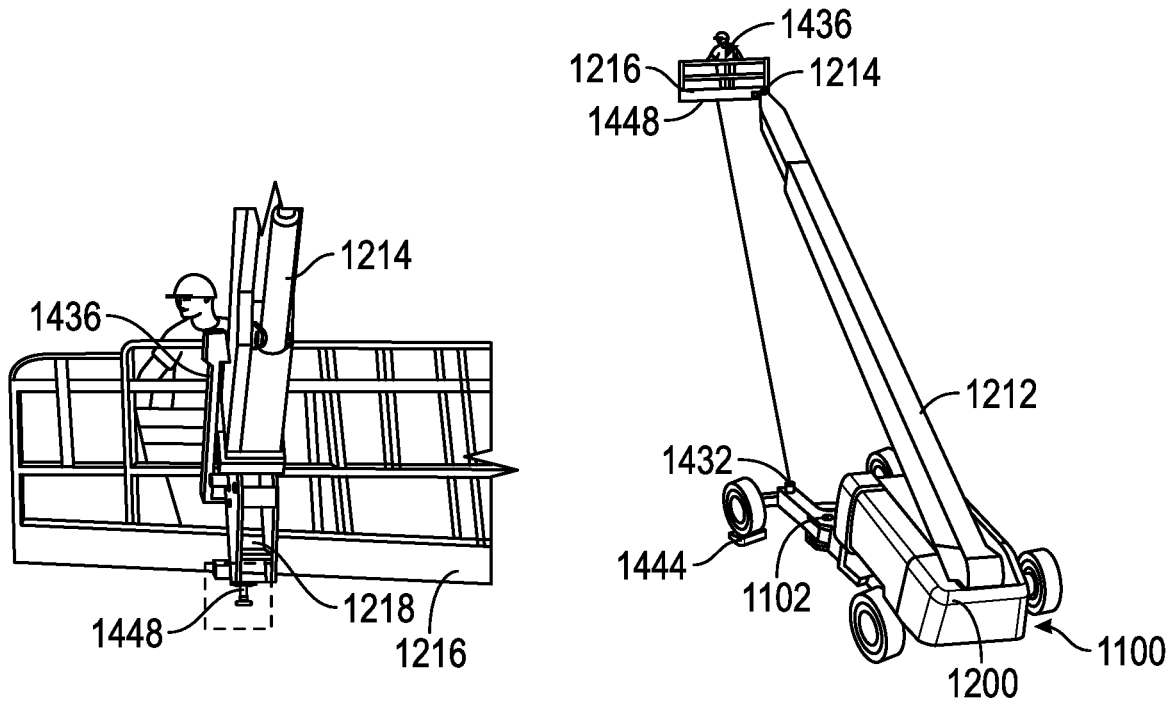
FIG. 30
FIG. 31

SYSTEMS AND METHODS FOR MACHINE PLACEMENT

CROSS-REFERENCE TO RELATED PATENT APPLICATIONS

This application claims the benefit of and priority to U.S. Provisional Application No. 63/128,499, filed Dec. 21, 2020, and U.S. Provisional Application No. 63/225,236, filed Jul. 23, 2021, the entire disclosures of which are incorporated by reference herein.

BACKGROUND

The present disclosure relates to reaching apparatuses such as booms or telehandlers. More particularly, the present disclosure relates to a reaching range of the reaching apparatuses.

SUMMARY

One embodiment of the present disclosure is a reach and placement tool. The reach and placement tool includes an eyepiece, an orientation sensor, a distance sensor, and a controller. The controller is configured to obtain a distance value and an orientation from the distance sensor and the orientation sensor when the reach and placement tool is directed towards a point of interest at a particular location. The controller is also configured to determine a coordinate of the point of interest using the distance value and the orientation, and compare the coordinate of the point of interest to a reach envelope to determine if the point of interest is within range of a particular reach apparatus.

Another embodiment of the present disclosure is a method for notifying a user if one or more points of interest are within reach of a reach apparatus. The method includes obtaining a distance value and an orientation from a distance sensor and an orientation sensor when a unit comprising both the distance sensor and the orientation sensor is directed towards a point of interest at a particular location. The method also includes determining a coordinate of the point of interest using the distance value and the orientation. The method also includes comparing the coordinate of the point of interest to a reach envelope to determine if the point of interest is within range of a particular reach apparatus. The method also includes operating a display screen to notify the user that the point of interest is within range of the particular reach apparatus or that the point of interest is not within range of the particular reach apparatus.

Another embodiment of the present disclosure is a system for determining if a point of interest is within reach of a reach apparatus. The system includes a unit having an orientation sensor and a distance sensor that are configured to obtain a distance value and an orientation when the unit is directed towards a point of interest at a particular location. The system also includes processing circuitry in communication with the orientation sensor and the distance sensor. The processing circuitry is configured to obtain the distance value and the orientation from the distance sensor and the orientation sensor. The processing circuitry is also configured to determine a coordinate of the point of interest using the distance value and the orientation. The processing circuitry is also configured to compare the coordinate of the point of interest to a reach envelope to determine if the point of interest is within range of a particular reach apparatus.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 18 is a perspective view of the range and position determination system of FIG. 16, according to an exemplary embodiment.

FIG. 19 is a perspective view of the range and position determination system of FIG. 16, according to an exemplary embodiment.

FIG. 20 is a perspective view of the range and position determination system of FIG. 16, according to an exemplary embodiment.

FIG. 23 is a table of status indicators for the range and position determination system of FIG. 16, according to an exemplary embodiment.

FIG. 24 is a front view of a cable of the range and position determination system of FIG. 16, according to an exemplary embodiment.

FIG. 25 is a schematic view of the range and position determination system of FIG. 16, according to an exemplary embodiment.

FIGS. 28A-H are perspective views of the worksite including the vehicle with the lift device and the range and position determination system of FIG. 26, according to an exemplary embodiment.

FIG. 29 is a perspective view of the range and position determination system of FIG. 26, according to an exemplary embodiment.

FIG. 30 is a perspective view of the worksite including the vehicle with the lift device and the range and position determination system of FIG. 26, according to an exemplary embodiment.

FIG. 31 is a perspective view of the worksite including the vehicle with the lift device and the range and position determination system of FIG. 26, according to an exemplary embodiment.

DETAILED DESCRIPTION

Figure 1:
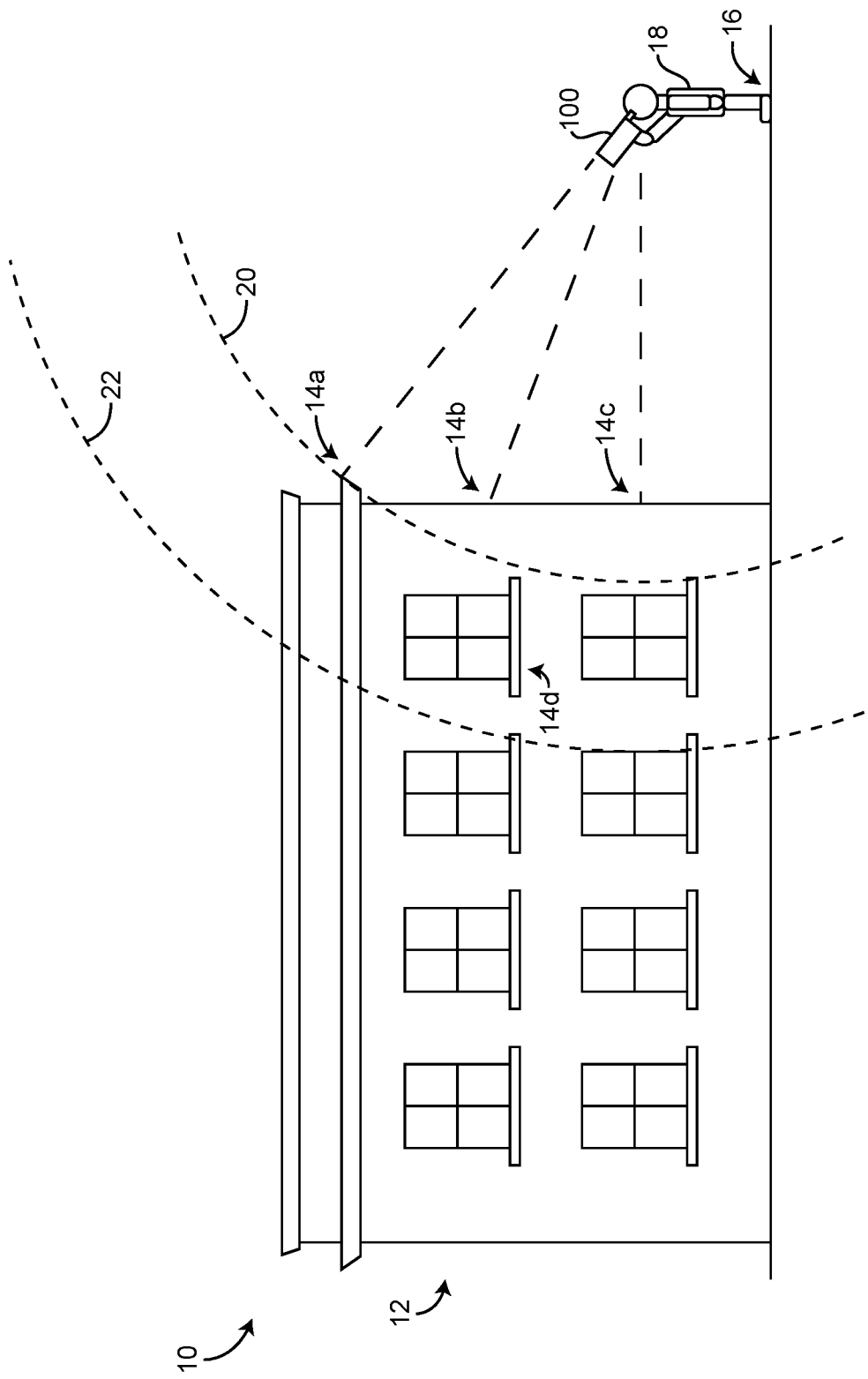
FIG. 1 is a diagram of a building and a worker using a reach and placement tool at a particular location to determine if an apparatus can reach one or more locations, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a reach and placement tool can be held by a worker, and directed at different points of interest at a particular location of a work site. The reach and placement tool may include an orientation sensor and a distance sensor that are configured to obtain a polar coordinate of each of the different points of interest as the worker directs the reach and placement tool towards the points of interest. The reach and placement tool can include an eyepiece or a scope to facilitate proper direction of the reach and placement tool. The reach and placement tool may store one or more reach envelopes for different reach apparatuses. The reach and placement tool uses the polar coordinates and the reach envelopes to determine which of the points of interest are within range of the reach apparatus. The reach and placement tool can include a display screen to notify the worker regarding which of the points of interest are within range. Advantageously, the reach and placement tool facilitates determining if the reach apparatus can reach all of the points of interest from the particular location.

The various exemplary embodiments disclosed herein also relate to systems, apparatuses, and methods for range and position determination for a lift device. In some embodiments, the lift device is mounted to a vehicle (e.g., a front end loader of a refuse vehicle, a lift drum of a concrete vehicle, a ladder boom of a fire or safety vehicle, a work platform of a boom lift, an implement of a telehandler, a work platform of a scissor lift, etc.). Within the context of this disclosure, a lift device can be embodied by any system or apparatus that moves spatially relative to a fixed point. For example, a work platform of a boom lift moves spatially relative to a frame of the boom lift. Even if the vehicle itself is moving (e.g., a fire truck moving forward) or stationary, the spatial movement of the lift device is relative to the fixed point of the vehicle (e.g., a ladder boom moves relative to the fire truck frame even if the entire fire truck is moving).

A range and position determination system of the vehicle is structured to recognize a relative position of the lift device relative to the chassis, and to determine a distance based on a user input. In some embodiments, the user input includes the user sighting a desired position (e.g., a position on a building) and identifying the desired position using a laser distance meter (LDM) and an inertial measurement unit (IMU). In some embodiments, other distance and alignment sensors or devices are included and/or the LDM and IMU are eliminated. In some embodiments, a camera and scanning system determines a distance of objects (e.g., power lines, buildings, bridges, etc.) and the user selects the desired position using a graphical user interface (GUI) generated on a human machine interface (HMI) such that the camera and scanning system can recognize a physical location based on the user's selection via the GUI. The user identified desired position is received by the range and position determination system as an input.

The range and position determination system is structured to analyze the chassis location, the desired position of the lift device, and generate a notification for the user indicating that the desired position is acceptable, or that the desired position is unacceptable. In some embodiments, the notification is in the form of a color coded map, augmented reality, or virtual reality image generation. In some embodiments, a thumbs up, thumbs down, red/green color coding, or another notification type is provided. The determination of acceptable or unacceptable may be based on load capacity charts or lookup tables (e.g., how high and far the lift device can be extended with the current load on the lifting device), or based on a physical clearance from objects (e.g., how far away are power lines or other obstructions).

Reach and Placement System

Overview

Referring to FIG. 1, a reach and placement system 10 can be used to determine if a reach apparatus (e.g., a boom, a telehandler, a cherry picker, etc.) can reach one or more points of interest 14 (e.g., work locations, reach locations, etc.), according to an exemplary embodiment. For example, the points of interest 14 may be different locations or work areas of a building 12. As shown in FIG. 1, the points of interest 14 include a first point of interest 14a (e.g., at scaffolding of the building 12), a second point of interest 14b (at a first height of a wall of the building 12), a third point of interest 14c (at a second height of the wall of the building 12), and a fourth point of interest 14d (at a window of the building 12). It should be understood that any number of points of interest 14 can be identified as either being within range of the reach apparatus, and the present disclosure is not limited to only four points of interest 14.

In order to determine if the reach apparatus can reach the points of interest 14 from a particular location 16, or to determine if the reach apparatus can reach one or more of the points of interest 14 when positioned at the particular location 16, a worker 18 may position themselves at the particular location 16 and use a reach and placement tool 100 to determine if a particular reach apparatus (e.g., a particular model of boom, telehandler, etc.) can reach the points of interest 14 or to determine which of the points of interest 14 the particular reach apparatus (e.g., the particular model of boom, telehandler, etc.) can reach. The reach and placement tool 100 can include one or more reach envelopes of various models of reach apparatuses (e.g., telehandlers, booms, cherry-pickers, etc.) so that the reach and placement tool 100 may identify which of the points of interest 14 are within an envelope or within a percentage of the envelope.

The reach and placement tool 100 can operate for a three-dimensional area, and may use distance sensors (e.g., infrared lasers, sonar, etc.) and orientation sensors (e.g., accelerometers, gyroscopes, etc.) to determine a distance and angular orientation of each of the points of interest 14 relative to the particular location 16. In some embodiments, the reach and placement tool 100 can simulate actual placement of the reach apparatus at the particular location 16 using the envelope to determine which of the points of interest 14 are reachable from the particular location 16. Advantageously, using the reach and placement tool 100 can facilitate determining an appropriate location for reaching the points of interest 14 before placement of the reach apparatus.

Referring still to FIG. 1, the reach and placement tool 100 can use a first reach envelope 22 and a second reach envelope 20. The first reach envelope 22 is a maximum or outer reach of a particular model of reach apparatus. The second reach envelope 20 is a portion of the first reach envelope 22 (e.g., 70% of the first reach envelope 22, 80% of the first reach envelope 22, etc.). The worker 18 may positions themselves at the particular location 16 (e.g., a location to be tested for reachability of the various points of interest 14) and point the reach and placement tool 100 at one of the points of interest 14 (e.g., the first point of interest 14a). The reach and placement tool 100 may identify a distance between the particular location 16 and the first point of interest 14a and also detect a particular orientation.

In some embodiments, the reach and placement tool 100 converts the distance and the orientation to polar coordinates. The reach and placement tool 100 can use the distance at the particular orientation to determine if the first point of interest 14a is within the first reach envelope 22, within the second envelope 20, or outside of the first reach envelope 22 (e.g., to determine if the first point of interest 14a is reachable from the particular location 16). If the first point of interest 14a is within the second reach envelope 20, the reach and placement tool 100 can notify the worker 18 that the first point of interest 14a is reachable by the particular model of the reach apparatus. If the first point of interest 14a is within the first reach envelope 22 but not within the second reach envelope 20, the reach and placement tool 100 can notify the worker 18 that the first point of interest 14a is within the first reach envelope 22 but not within the second reach envelope 20. If the first point of interest 14a is outside of the first reach envelope 22, the reach and placement tool 100 can notify the worker 18 that the first point of interest 14a is not reachable by the particular model of the reach apparatus.

The worker 18 may repeat this procedure for each of the points of interest 14a-14d. As shown in FIG. 1, the first point of interest 14a is at the second reach envelope 20 and is therefore reachable by the particular model of the reach apparatus. Similarly, the second point of interest 14b and the third point of interest 14c are reachable by the particular model of the reach apparatus since the second point of interest 14b and the third point of interest 14c are within the second reach envelope 20. However, the fourth point of interest 14d is outside of the second reach envelope 20, but within the first reach envelope 22. The fourth point of interest 14d may therefore be unreachable by the particular model of the reach apparatus and the reach and placement tool 100 can notify the worker as such.

The reach and placement tool 100 can use sensor data from distance sensors and orientation sensors to generate different polar coordinates of each of the points of interest 14. In some embodiments, the worker 18 can aim (e.g., point towards, direct towards, etc.) the reach and placement tool 100 at different points of interest 14, and record a coordinate point (e.g., a polar coordinate) for different points of interest 14 (e.g., by pressing a button to capture current distance and orientation data). In some embodiments, the reach and placement tool 100 reports in real-time if a captured coordinate point (e.g., a point of interest 14 at which the reach and placement tool 100 is directed) is within a reach of a currently selected or loaded model of a reach apparatus in real-time (e.g., through operation of an alert light according to different colors, through operation of an aural alert device, through operation of a user interface or a display screen, etc.). In some embodiments, the reach and placement tool 100 can be used by the worker 18 to capture coordinates (e.g., polar coordinates) of multiple points of interest 14 relative to the particular location 16. In some embodiments, the reach and placement tool 100 can provide a summary or a display graphic of each of the coordinates of the multiple points of interest 14, indicating which of the multiple points of interest 14 are within range. The worker 18 may view such summary or display graphic after capturing the coordinates of the multiple points of interest 14. The worker 18 may also assign names or tags to the different coordinates of the multiple points of interest 14 to facilitate the review of the summary or the display graphic.

It should be understood that different reach envelopes associated with different reach apparatuses can be selected by the worker 18 or loaded onto the reach and placement tool 100. For example, the worker 18 may capture different coordinates of multiple points of interest 14 and identify which models of reach apparatuses are able to reach the points of interest 14. In this way, the reach and placement tool 100 can be used by the worker 18 for proper selection of a model or type of reach apparatus. The reach and placement tool 100 can also be used to determine if the particular location 16 should be adjusted. For example, if the reach and placement tool 100 determines that one or more of the points of interest 14 are unreachable by a particular reach apparatus, but the worker 18 desires to use the particular reach apparatus, the worker 18 may move to a new location (e.g., closer to the points of interest 14) to identify if the points of interest 14 can be reached from the new location. In this way, the reach and placement tool 100 can be used by the worker 18 to determine a proper placement of the particular reach apparatus without requiring actual placement of the particular reach apparatus.

Polar Coordinate System

Figure 2:
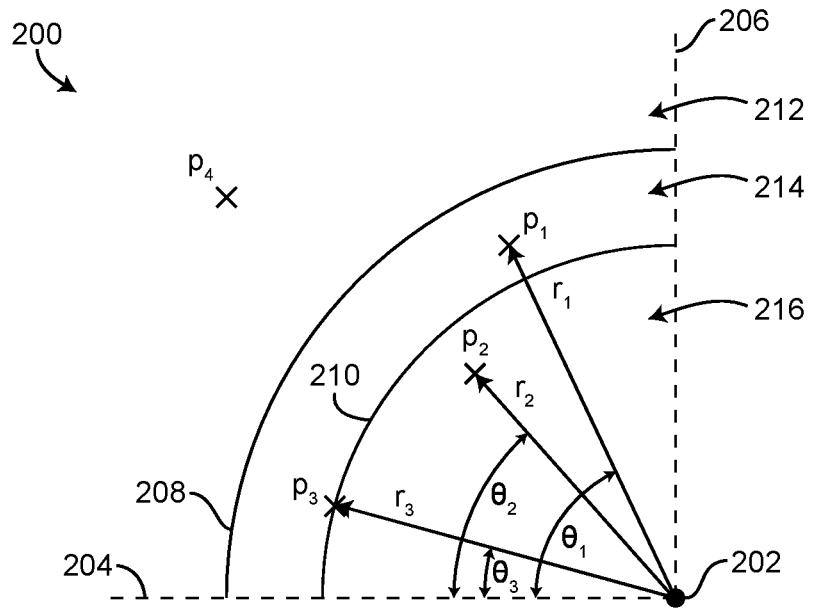
FIG. 2 is a diagram of a polar coordinate system including circular reach envelopes of an apparatus and one or more points of interest relative to a reference point, according to an exemplary embodiment.
Figure 3:
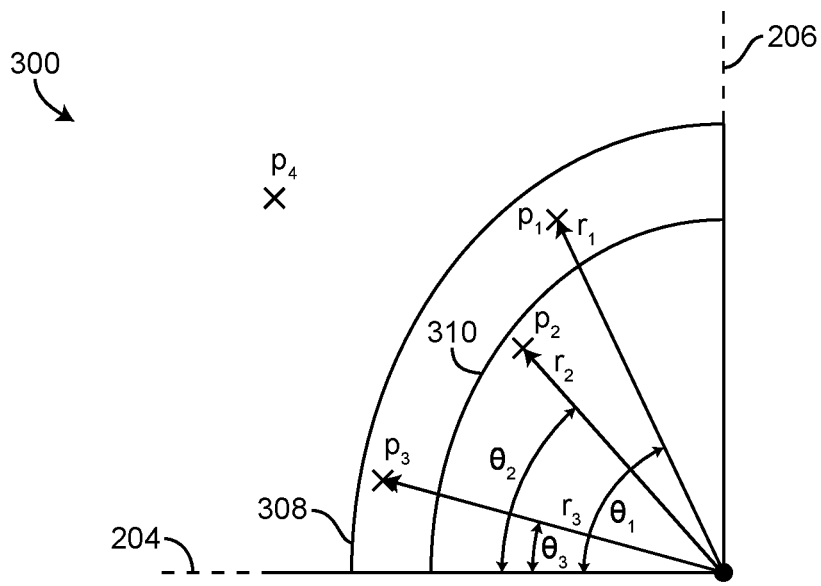
FIG. 3 is another diagram of a polar coordinate system including non-circular reach envelopes of an apparatus and one or more points of interest relative to a reference point, according to an exemplary embodiment.

According to an exemplary embodiment, as shown in FIGS. 2-3, the reach and placement tool 100 can use a polar coordinate system to determine which of the points of interest 14 are within reach of a reach apparatus. As shown in FIG. 2, a polar coordinate system 200 that is usable by the reach and placement tool 100 includes an origin 202, a vertical axis 206, and a horizontal axis 204. The origin 202 may be the particular location 16 at which various polar coordinates are captured.

The polar coordinate system 200 also includes multiple polar coordinates, $p_1$, $p_2$, $p_3$, and $p_4$. Each polar coordinate $p_n$ includes a corresponding radius $r_n$ extending from the origin 202 to the polar coordinate $p_n$ and at least one corresponding angle $\theta_n$ extending between one of the axes 204 or 206 and the corresponding radius $r_n$. In some embodiments, the polar coordinates $p_1$, $p_2$, $p_3$, and $p_4$ are expressed as polar vectors (e.g., $\vec{v}_1$, $\vec{v}_2$, $\vec{v}_3$, and $\vec{v}_4$) including a radius (e.g., a scalar quantity $r_1$, $r_2$, $r_3$, and $r_4$) and one or more corresponding angles (e.g., $\theta_{1,x}$, $\theta_{2,x}$, $\theta_{3,x}$, and $\theta_{4,x}$ and/or $\theta_{1,y}$, $\theta_{2,y}$, $\theta_{3,y}$, and $\theta_{4,y}$). In this way, the polar coordinates $p_n$ can be expressed as spherical coordinates, polar coordinates, Cartesian coordinates, etc. It should be understood that while FIGS. 2-3 show the polar coordinates $p_n$ in a two-dimensional coordinate system, each including a radius $r_n$ and an angle $\theta_4$, the polar coordinates $p_n$ can be expressed in a three-dimensional coordinate system as three-dimensional polar coordinates, spherical coordinates, cylindrical coordinates, Cartesian coordinates, etc.

Referring particularly to the polar coordinate system 200 of FIG. 2, the polar coordinates $p_1$, $p_2$, $p_3$, and $p_4$ may each correspond to a different point of interest 14. For example, the first polar coordinate $p_1$ includes a corresponding radius $r_1$ and a corresponding angle $\theta_1$ and may provide a polar coordinate representation of a first point of interest (e.g., the first point of interest 14a) relative to the origin 202 (e.g., relative to a particular location such as the particular location 16). Similarly, the second polar coordinate $p_2$ includes a corresponding radius $r_2$ and a corresponding angle $\theta_2$ and may provide a polar coordinate representation of a second point of interest (e.g., the second point of interest 14b) relative to the origin 202 (e.g., relative to a particular location such as the particular location 16). The third polar coordinate $p_3$ includes a corresponding radius $r_3$ and a corresponding angle $\theta_3$ and may provide a polar coordinate representation of a third point of interest (e.g., the third point of interest 14c) relative to the origin 202 (e.g., relative to a particular location such as the particular location 16). The fourth polar coordinate $p_4$ includes a corresponding radius $r_4$ and a corresponding angle $\theta_4$ and may provide a polar coordinate representation of a fourth point of interest (e.g., the fourth point of interest 14d) relative to the origin 202 (e.g., relative to a particular location such as the particular location 16).

In some embodiments, values of the radii $r_1$, $r_2$, $r_3$, and $r_4$ are obtained from a distance sensor (e.g., lasers 106) of the reach and placement tool 100, and values of the angles $\theta_1$, $\theta_2$, $\theta_3$, and $\theta_4$ are obtained from an orientation sensor (e.g., a gyroscope, accelerometers, orientation sensor 116, etc.) of the reach and placement tool 100. For example, the radius $r_1$ and the angle $\theta_1$ of the first polar coordinate $p_1$ may be obtained by the reach and placement tool 100 when the reach and placement tool 100 is directed towards a first point of interest (e.g., the first point of interest 14a). Similarly, the radius $r_2$ and the angle $\theta_2$ of the second polar coordinate $p_2$, the radius $r_3$ and the angle $\theta_3$ of the third polar coordinate $p_3$, and the radius $r_4$ and the angle $\theta_4$ of the fourth polar coordinate $p_4$ may be obtained by the reach and placement tool 100 when the reach and placement tool 100 is directed towards a second point of interest (e.g., the second point of interest 14b), a third point of interest (e.g., the third point of interest 14c) and a fourth point of interest 14d (e.g., the fourth point of interest 14d), respectively. In some embodiments, the first polar coordinate $p_1$, the second polar coordinate $p_2$, the third polar coordinate $p_3$, and the fourth polar coordinate $p_4$ or the components thereof (e.g., the radius $r_n$ and the angle $\theta_n$) are obtained by successively pointing the reach and placement tool 100 towards different points of interest and pressing a button to record the polar coordinates while the reach and placement tool 100 is pointed at each of the different points of interest.

Referring still to FIG. 2, the polar coordinate system 200 includes a first reach envelope 208, and a second reach envelope 210. In some embodiments, the first reach envelope 208 is an outer reach limit of a selected model of a reach apparatus. In some embodiments, the second reach envelope 210 is a portion of the first reach envelope 208. For example, the second reach envelope 210 may be 60% of the first reach envelope 208, 70% of the first reach envelope 208, etc., or any other portion of the first reach envelope 208 thereof. In some embodiments, the first reach envelope 208 is a polar equation having the form $r_1 = f(\theta)$. Similarly, the second reach envelope 210 can also be expressed as a polar equation having the form $r_2 = xf(\theta)$ where $f(\theta)$ is the polar equation of the first reach envelope 208 and x is a predetermined normalized amount (e.g., a value between 0 and 1). For example, if the second reach envelope 210 is 60% of the first reach envelope 208, the predetermined normalized amount x may have a value of 0.6.

The first reach envelope 208 and the second reach envelope 210 can define one or more regions in the polar coordinate system 200. For example, an area outside of the first reach envelope 208, shown as first region 212 may indicate locations that are unreachable by the selected reach apparatus. An area between the first reach envelope 208 and the second reach envelope 210 may indicate locations that are unreachable by the selected reach apparatus within a restricted capacity of the reach apparatus (e.g., locations that are outside of the second reach envelope 210 but within the first reach envelope 208), shown as second region 214. An area within the second reach envelope 210 may indicate locations that are reachable by the selected reach apparatus within the restricted capacity of the selected reach apparatus (e.g., locations that are within the second reach envelope 210), shown as third region 216.

The reach and placement tool 100 can use the polar equations of the first reach envelope 208 and the second reach envelope 210 to determine which of the polar coordinates $p_n$ are within range. For example, if the first polar coordinate $p_1$ is measured at an angle $\theta_1$, the reach and placement tool 100 can estimate a corresponding radius value of the second envelope 210 at the angle $\theta_1$. The reach and placement tool 100 can then compare the corresponding radius value of the second envelope 210 at the angle $\theta_1$ to the radius $r_1$ of the first polar coordinate $p_1$. If the corresponding radius value of the second envelope 210 at the angle $\theta_1$ is greater than or equal to the radius $r_1$ of the first polar coordinate $p_1$, the reach and placement tool 100 can determine that the first location of interest (corresponding to the first polar coordinate $p_1$) is within the second envelope 210. If the corresponding radius value of the second envelope 210 at the angle $\theta_1$ is less than the radius $r_1$ of the first polar coordinate $p_1$, but the radius $r_1$ of the first polar coordinate $p_1$ is less than or equal to a corresponding radius value of the first envelope 208 at the angle $\theta_1$ (e.g., $r_1(\theta_1)$), then the reach and placement tool 100 can determine that the first point of interest is within the second region 214. Finally, if the reach and placement tool 100 determines that the radius $r_1$ of the first polar coordinate $p_1$ is greater than a corresponding radius value of the first reach envelope 208 at the angle $\theta_1$, the reach and placement tool 100 may determine that the first polar coordinate $p_1$ is in the first region 212 and is unreachable by the selected reach apparatus.

The reach and placement tool 100 can perform this functionality for each of the different polar coordinates $p_1$, $p_2$, $p_3$, and $p_4$. For example, the reach and placement tool 100 may identify that the fourth polar coordinate $p_4$ is in the first region, that the first polar coordinate $p_1$ is in the second region 214, and that the second and third polar coordinates $p_2$ and $p_3$ are within the third region 216. In some embodiments, the reach and placement tool 100 performs such analysis in real-time or near real-time as data for the polar coordinates are obtained. For example, when the reach and placement tool 100 obtains the first polar coordinate $p_1$, the reach and placement tool 100 may perform the functionality described herein, and notify the worker 18 regarding which of the regions 212-216 the first polar coordinate $p_1$ and therefore the first point of interest, is within. The reach and placement tool 100 may similarly perform this functionality in real-time as data for each subsequent polar coordinate is obtained.

Referring now to FIG. 3, a polar coordinate system 300 is shown, according to another exemplary embodiment. The polar coordinate system 300 is the same as the polar coordinate system 200 but includes different envelopes. As shown in FIG. 3, the polar coordinate system 300 includes a first envelope 308 that is different than the first envelope 208, and a second envelope 310 that is different than the second envelope 210. While the first envelope 208 and the second envelope 210 shown in FIG. 2 are circular, the first envelope 308 and the second envelope 310 shown in FIG. 3 are non-circular. As shown in FIGS. 2-3, the first envelopes 208 and 308, and the second envelopes 210 and 310 may be circular or non-circular, depending on which model of reach apparatus is selected.

Reach and Placement Tool

Figure 4:
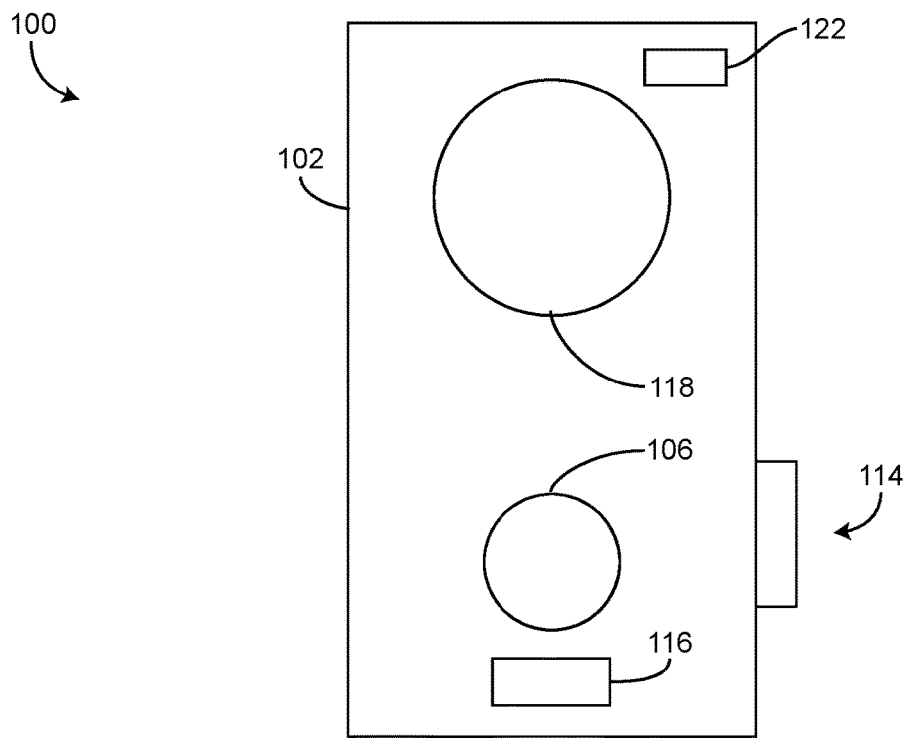
FIG. 4 is a front view of the reach and placement tool of FIG. 1, according to an exemplary embodiment.
Figure 5:
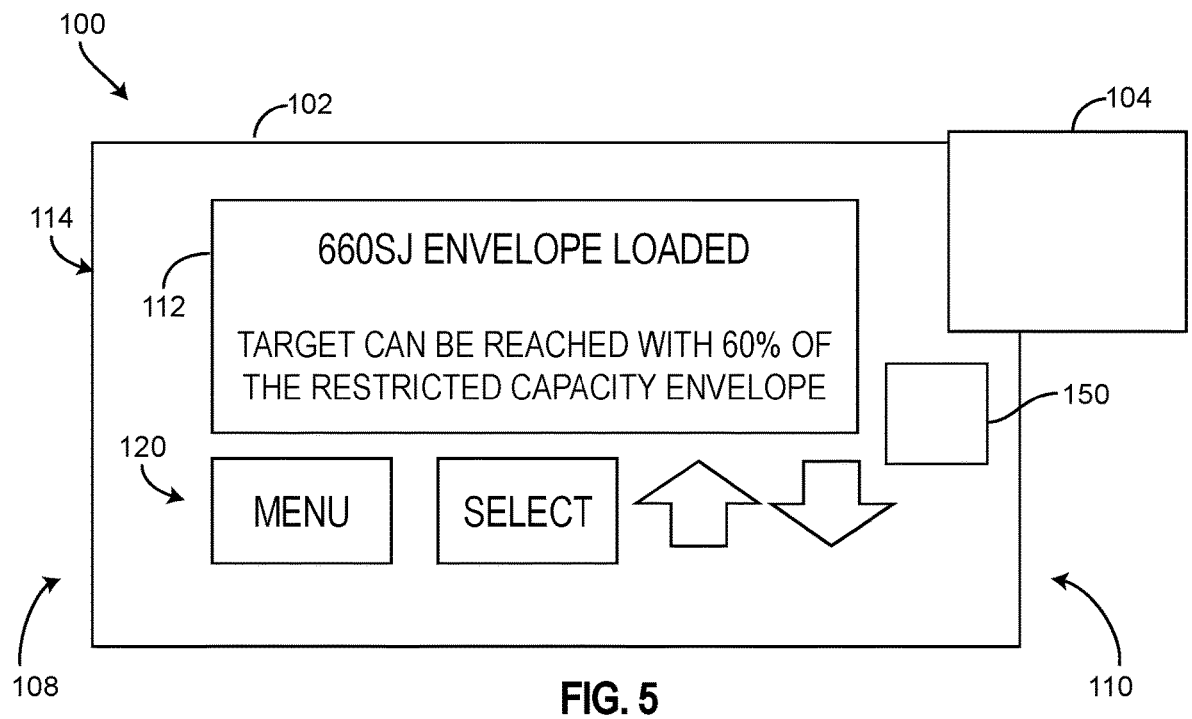
FIG. 5 is a side view of the reach and placement tool of FIG. 1, according to an exemplary embodiment.
Figure 6:
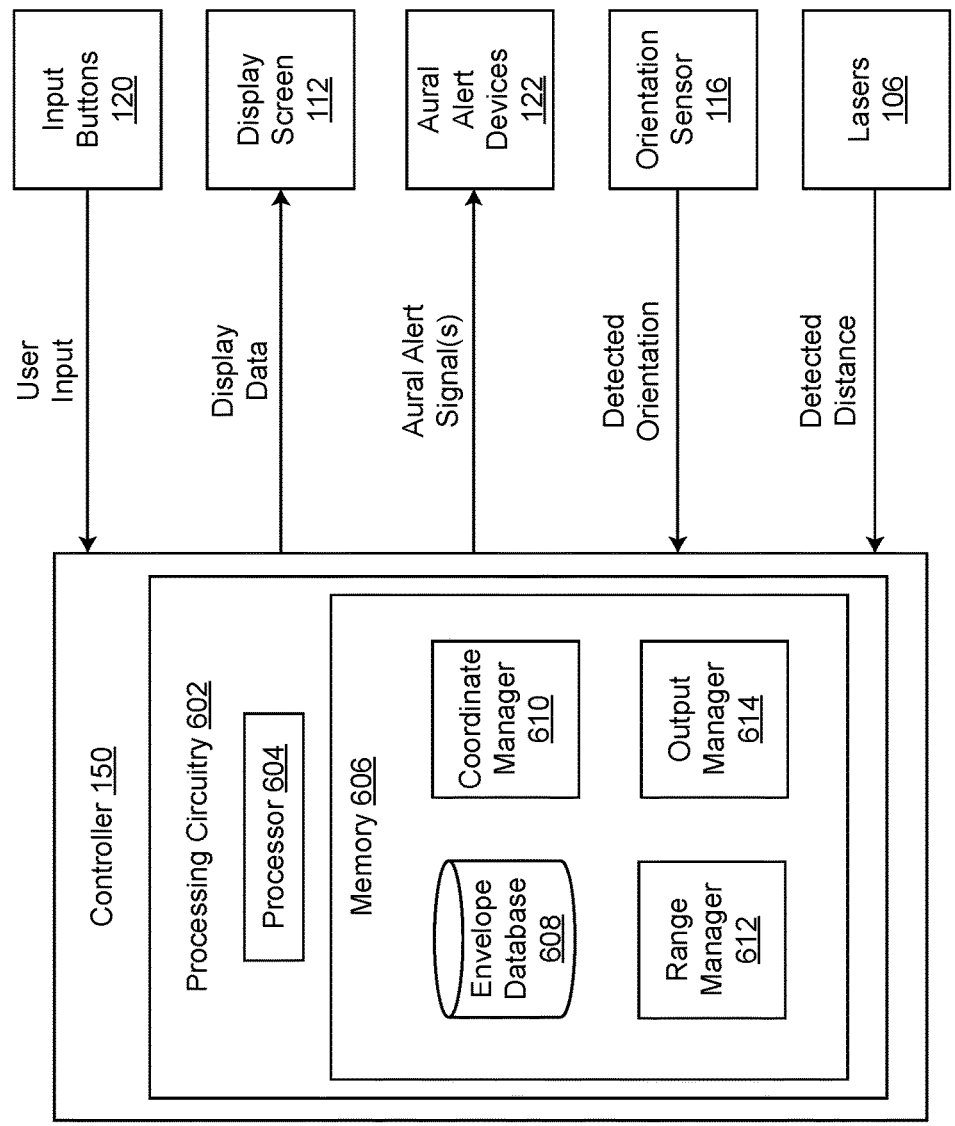
FIG. 6 is a block diagram of the reach and placement tool of FIGS. 1 and 4-5, according to an exemplary embodiment.

Referring now to FIGS. 4-6, the reach and placement tool 100 includes a body 102, a pair of lasers 106, and a user interface 114. In some embodiments, the lasers 106 are range-finding lasers configured to. The reach and placement tool 100 also includes an orientation sensor 116 (e.g., an accelerometer, a gyroscope, an inclinometer, etc.) and an eyepiece 104. The reach and placement tool 100 also includes a lens 118 or multiple lenses (e.g., a scope, a laser scope, etc.). When a worker looks through the eyepiece 104, the worker may be able to view surrounding landscapes and points of interest through the eyepiece 104 and the lens 118. The lens 118 can also include a laser point that is viewable by the worker through the eyepiece 104 that indicates a point that the reach and placement tool 100 is pointed at or directed towards.

The eyepiece 104 may be positioned on a rear 110 of the body 102 or of the reach and placement tool 100. The lens 118 and the laser 106 are positioned on a front 108 of the body 102 or of the reach and placement tool 100. The user interface 114 can be positioned on a side of the body 102. The user interface 114 includes a display screen 112 and one or more input buttons 120. The one or more buttons may include navigation buttons (e.g., an up button and a down button), a menu button, and a select button. In other embodiments, the reach and placement tool 100 is configured to communicate with a personal computer device (e.g., a smartphone) via a wireless communications protocol (e.g., Bluetooth). The worker may connect their personal computer device with the reach and placement tool 100 and operate the reach and placement tool 100 via the personal computer device.

The reach and placement tool 100 can also include an aural alert device 122 (e.g., a speaker) that is configured to provide auditory or aural alerts to the worker 18. The auditory or aural alerts can indicate whether a current point of interest (e.g., a point of interest towards which the reach and placement tool 100 is directed or pointed) is within range.

Referring still to FIGS. 4-6, the reach and placement tool 100 includes a controller 150 that is configured to perform various functionality of the reach and placement tool 100. The controller 150 and the orientation sensor 116 are positioned within the body 102. Referring particularly to FIG. 6, the controller 150 includes processing circuitry 602 including a processor 604 and memory 606. Processor 604 may be a general purpose or specific purpose processor, an application specific integrated circuit (ASIC), one or more field programmable gate arrays (FPGAs), a group of processing components, or other suitable processing components. Processor 604 may be configured to execute computer code or instructions stored in memory 606 or received from other computer readable media (e.g., CDROM, network storage, a remote server, etc.).

Memory 606 may include one or more devices (e.g., memory units, memory devices, storage devices, etc.) for storing data and/or computer code for completing and/or facilitating the various processes described in the present disclosure. Memory 606 may include random access memory (RAM), read-only memory (ROM), hard drive storage, temporary storage, non-volatile memory, flash memory, optical memory, or any other suitable memory for storing software objects and/or computer instructions. Memory 606 may include database components, object code components, script components, or any other type of information structure for supporting the various activities and information structures described in the present disclosure. Memory 606 may be communicably connected to processor 604 via processing circuitry 602 and may include computer code for executing (e.g., by processor 604) one or more processes described herein.

As shown in FIG. 6, the controller 150 can communicate with any of the input buttons 120, the display screen 112, the aural alert devices 122, the orientation sensor 116, and the lasers 106. For example, the controller 150 can receive a user input from the input buttons 120 indicating a selected model, a type of reach apparatus, a command to capture data regarding a point of interests towards which the reach and placement tool 100 is currently directed, etc. The controller 150 can provide display data to the display screen 112 (e.g., indicating if one or more points of interest are within range). The controller 150 can provide aural alert signal(s) to the aural alert devices 122 so that the aural alert devices 122 operate to provide an auditory alert (e.g., a sound, a noise, a tone, etc.) to the worker 18 (e.g., to indicate if a point of interest is within range or not). The controller 150 can obtain a detected orientation from the orientation sensor 116 and a detected distance from the lasers 106.

As shown in FIG. 6, the memory 606 includes an envelope database 608, a coordinate manager 610, a range manager 612, and an output manager 614, according to an exemplary embodiment. The envelope database 608 is configured to store different sets of polar equations or envelopes (e.g., envelopes 308 and 310, envelopes 208 and 210, similar envelopes, etc.) for different reach apparatuses, different models of reach apparatuses, mobile elevated work platforms, etc. When the controller 150 receives a selected reach apparatus or a selected model of a reach apparatus, the controller (e.g., the range manager 612) may retrieve one or more envelopes or equations of envelopes from the envelope database 608. The envelopes may be 2 dimensional or 3 dimensional envelopes and can be expressed in polar equations (e.g., including a radius as a function of one or two angles).

The coordinate manager 610 is configured to obtain the detected distance from the lasers 106 and the detected orientation from the orientation sensor 116 to generate a coordinate (e.g., a polar coordinate) regarding a first point of interest. The coordinate manager 610 may receive the detected distance and the detected orientation from the lasers 106 and the orientation sensor 116 in real-time. In some embodiments, the controller 150 operates in real-time. In other embodiments, the coordinate manager 610 captures the detected distance from the lasers 106 and the detected orientation from the orientation sensor 116 when the worker 18 presses a button (e.g., when a user input is received). The coordinate manager 610 may use the detected distance obtained from the lasers 106 and the detected orientation from the orientation sensor 116 to generate radius r values and angle values (e.g., $\theta_1$ and $\theta_2$) that define the polar coordinate of a particular point of interest (e.g., which the reach and placement tool 100 is currently directed towards). The coordinate manager 610 may perform such operations for each of multiple points of interest to generate multiple polar coordinates.

The range manager 612 is configured to obtain the polar coordinates from the coordinate manager 610 and the envelopes from the envelope database 608 for the particular reach apparatus (or model thereof) and determine if the points of interest represented by the polar coordinates are within range (e.g., within the envelopes). The range manager 612 may obtain multiple envelopes (e.g., an absolute reach envelope, 60% of the absolute reach envelope, etc.) and determine if a current point of interest towards which the reach and placement tool 100 is directed is within range. The range manager 612 may perform such operations in real-time (e.g., while the reach and placement tool 100 is directed towards a point of interest) or may perform such operations for each of multiple coordinates after multiple polar coordinates have been obtained. The range manager 612 may use equations of the envelopes (e.g., polar equations) to evaluate a radius value at the orientation of a particular polar coordinate or point of interest. The range manager 612 can then compare the detected distance (e.g., the radius of the polar coordinate of the point of interest) to the radius of the envelope at the particular orientation. If the detected distance is less than the radius of the envelope (or less than a radius of a 60% envelope), the range manager 612 may determine that the polar coordinate or the point of interest represented thereof is reachable by the reach apparatus. If the detected distance is greater than the radius of the envelope at the detected orientation, the range manager 612 may determine that the polar coordinate or the point of interest represented thereof by the polar coordinate is not reachable by the reach apparatus.

The output manager 614 is configured to generate the display data from the display screen 112 and/or the aural alert signal(s) for the aural alert devices 122. The output manager 614 can generate display data for the display screen 112 to notify the worker 18 regarding whether or not a current point of interest (e.g., a point of interest towards which the reach and placement tool 100 is currently directed) is reachable by the reach apparatus, and/or which of multiple points of interest are reachable by the reach apparatus. The display data can include a graphical representation (e.g., a 2d graphical representation, a 3d graphical representation, etc.) of the envelope of the reach apparatus and one or more polar coordinates that represent different points of interest. The graphical representation can provide a graphical representation of which of the points of interest are reachable by the reach apparatus. The output manager 614 may also operate the aural alert devices (e.g., by generating and providing aural alert signal(s) to the aural alert devices 122) to notify the worker 18 regarding whether or not a current point of interest (e.g., a point of interest towards which the reach and placement tool 100 is currently directed) is within range of the reach apparatus.

Process

Figure 7:
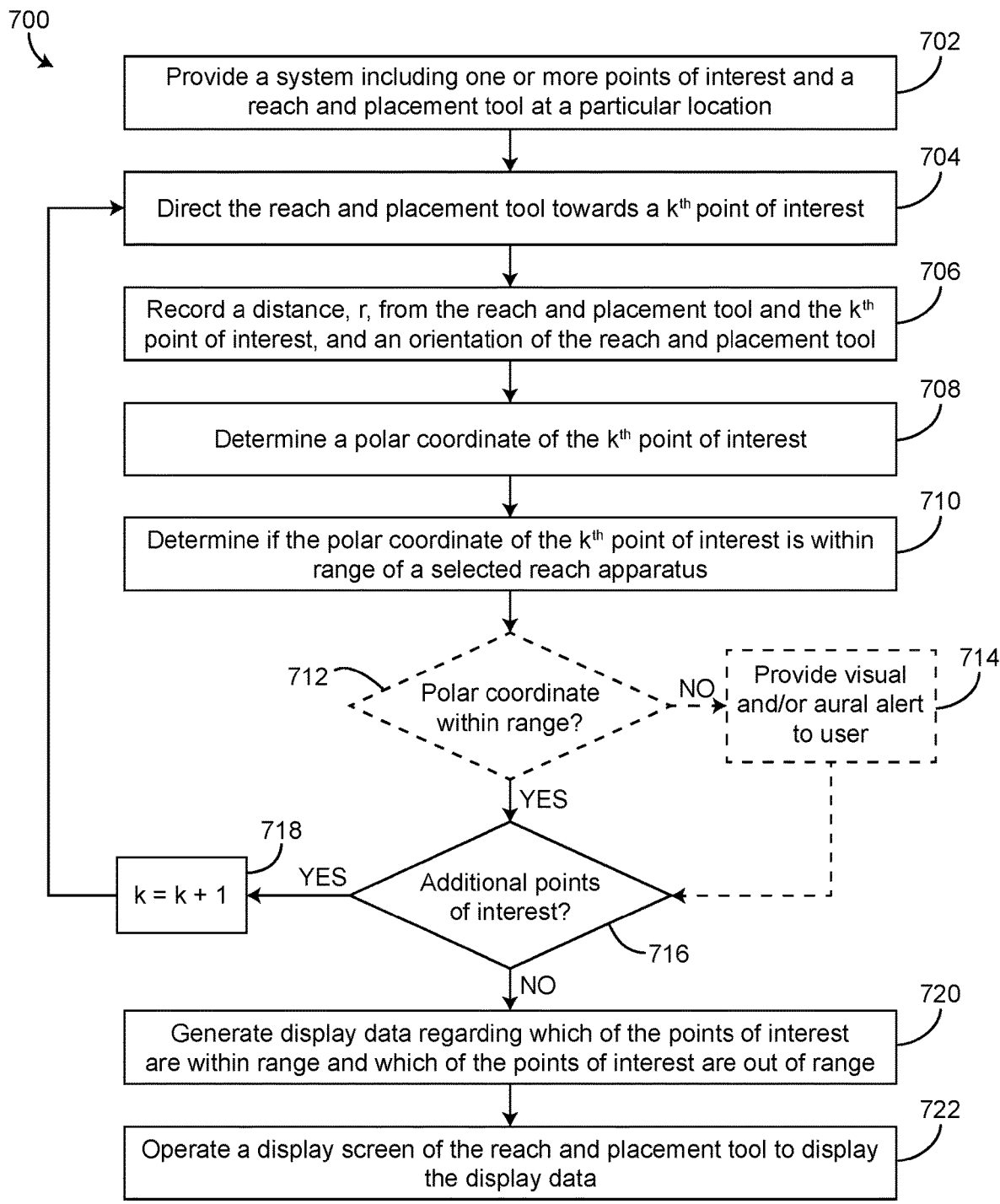
FIG. 7 is a flow diagram of a process for determining if a reaching apparatus can reach one or more points of interest from a current location, according to an exemplary embodiment.

Referring now to FIG. 7, a process 700 for determining if a reach apparatus can reach one or more points of interest is shown, according to an exemplary embodiment. The process 700 includes steps 702-722 and can be performed by the reach and placement tool 100 and the worker 18 that operates the reach and placement tool 100. Advantageously, the process 700 facilitates determining if one or more points of interest at a work site can be reached by a reach apparatus from a particular location before the reach apparatus is placed at the particular location.

Process 700 includes providing a system including one or more points of interest and a reach and placement tool (step 702) at a particular location. The system may be the reach and placement system 10 as shown in FIG. 1 and described in greater detail above with reference to FIG. 1. The one or more points of interest may be locations or places at a worksite (e.g., a location on scaffolding of a building, an elevated location, etc.). The reach and placement tool can be the reach and placement tool 100 as described herein and above.

Process 700 includes directing the reach and placement towards a $k^{th}$ point of interest (step 704). Step 704 can be performed by the worker 18 using the reach and placement tool 100. For example, the worker 18 may look through the eyepiece 104 to facilitate directing the reach and placement tool 100 towards the $k^{th}$ point of interest (e.g., a first point of interest). Variable k is a counter for ease of description, that can be assumed to initially have a value of one. The worker 18 may stand at the particular location and point the reach and placement tool 100 towards the $k^{th}$ point of interest to perform step 704.

Process 700 includes recording a distance r from the reach and placement tool and the $k^{th}$ point of interest and an orientation of the reach and placement tool (step 706). Step 706 can be performed by the reach and placement tool 100 by recording a detected orientation (e.g., as detected by the orientation sensor 116) and recording a detected distance (e.g., as detected by the lasers 106). Step 706 can be performed in response to the worker 18 pressing a button or otherwise indicating that the reach and placement tool 100 is currently directed towards the $k^{th}$ point of interest.

Process 700 includes determining a polar coordinate of the $k^{th}$ point of interest (step 708). Step 708 can be performed by coordinate manager 610 using the recorded distance r and the orientation of the reach and placement tool. The polar coordinate may be a two-dimensional polar coordinate (e.g., including a radius and a single angle) or a three-dimensional polar coordinate (e.g., including a radius and two angles). The $k^{th}$ point of interest may also be represented as a spherical coordinate, a cylindrical coordinate, a Cartesian coordinate, etc. The polar coordinate generally represents a distance and angular orientation of the $k^{th}$ point of interest relative to the particular location at which the reach and placement tool 100 is located.

Process 700 includes determining if the polar coordinate of the $k^{th}$ point of interest is within range of a selected reach apparatus (step 710). Step 710 can be performed by retrieving a reach envelope from a database (e.g., from envelope database 608) for a particular reach apparatus or a particular model of reach apparatus that is selected by the worker 18. Step 710 can be performed by the coordinate manager 610 and the range manager 612 using the detected distance and the detected orientation in combination with an envelope obtained from the envelope database 608.

Process 700 includes determining if the polar coordinate is within range (step 712). Step 712 may be optional and can be performed in response to step 710. If the polar coordinate is not within range (step 712, "NO"), process 700 may proceed to step 714. If the polar coordinate is within range (step 712, "YES"), process 700 may proceed to step 716. Step 712 can be performed by range manager 612 by comparing a radius of an envelope for a corresponding orientation to the detected distance or the radius of the polar coordinate relative to an origin of a polar coordinate system.

Process 700 includes providing a visual and/or an aural alert to a user (step 714) in response to the polar coordinate not being within range (step 712, "NO"). Step 714 can be performed by the output manager 614 by generating display data for the display screen 112 and by generating aural alert signal(s) for the aural alert devices 122 and providing the display data and the aural alert signal(s) to the display screen 112 and the aural alert devices 122. Steps 712 and 714 can be performed in real-time to provide real-time notifications to the worker 18 regarding whether or not the point of interest that the worker 18 is currently directing the reach and placement tool 100 towards is reachable. In this way, the worker 18 can be notified in real-time by the reach and placement tool 100 regarding reachability of the various points of interest.

Process 700 includes determining if additional points of interest are required (step 716) and returning to step 704 (step 716, "YES") if additional points of interest are required. As process 700 returns to step 704, the counter k may be incremented by one (step 718). Steps 704-714 may then be repeated until all points of interest have been scanned (step 716, "NO").

Process 700 includes generating display data regarding which of the points of interest are within range and which points of the points of interest are out of range (step 720). Step 720 can be performed by the output manager 614 based on the results of step 710 for each of the captured coordinates (e.g., each coordinate corresponding to a different point of interest). The display data can include graphical representations of the one or more points of interest or polar coordinates and a graphical representation of one or more envelopes on a polar coordinate system. The display data can include a visual representation of which of the points of interest are within range and which of the points of interest are out of range.

Process 700 includes operating a display screen of the reach and placement tool to display the display data (step 722). Step 722 can be performed by the output manager 614 and the display screen 112. Step 722 may be performed so that the worker 18 can view the display screen 112 and determine if the reach apparatus can be placed at the particular location to reach all points, or if process 700 should be repeated using the reach and placement tool 100 at a different location (e.g., at a closer location). The worker 18 may also view the envelopes of different reach apparatuses with the points of interest to determine if different equipment can reach the points of interest from the particular location.

Alternative Control Architectures

Figure 8:
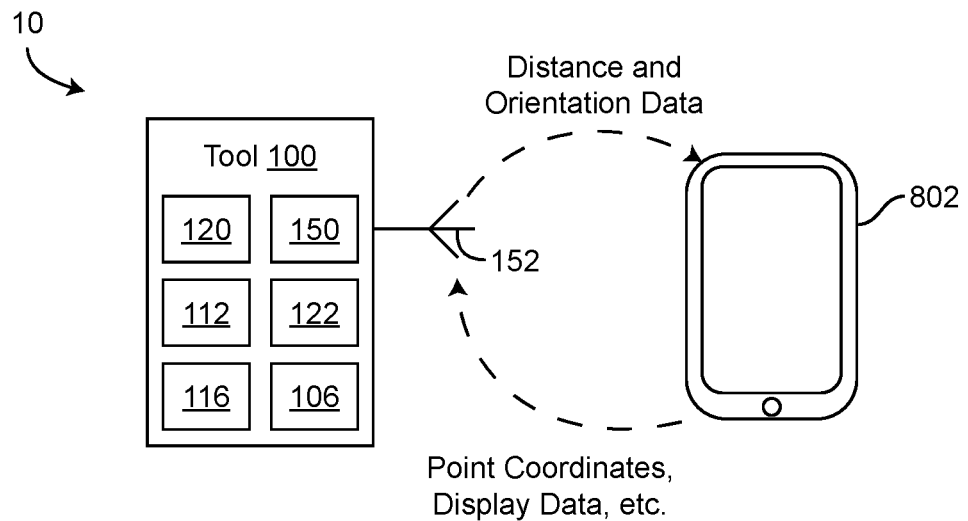
FIG. 8 is a block diagram of the reach and placement tool of FIGS. 1-6 providing sensor data to a personal computer device for analysis and processing, according to an exemplary embodiment.
Figure 9:
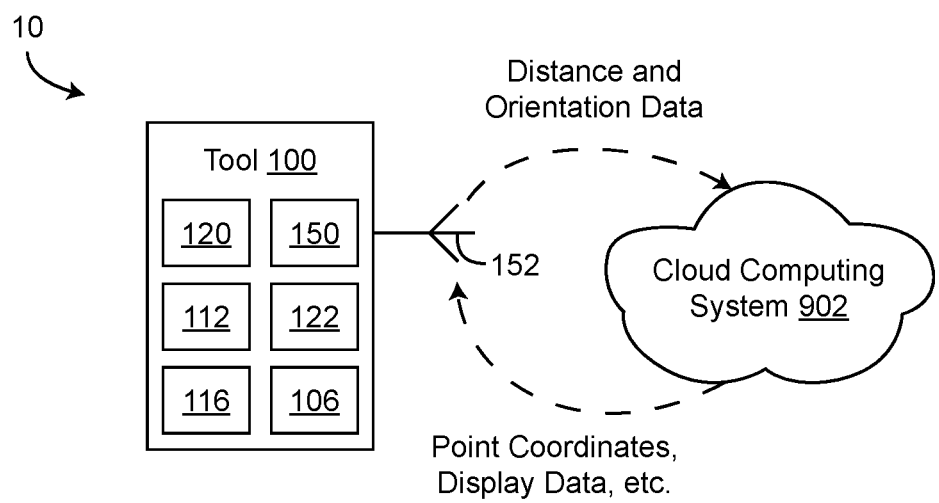
FIG. 9 is a block diagram of the reach and placement tool of FIGS. 1-6 providing sensor data to a cloud computing system for analysis and processing, according to an exemplary embodiment.
Figure 10:
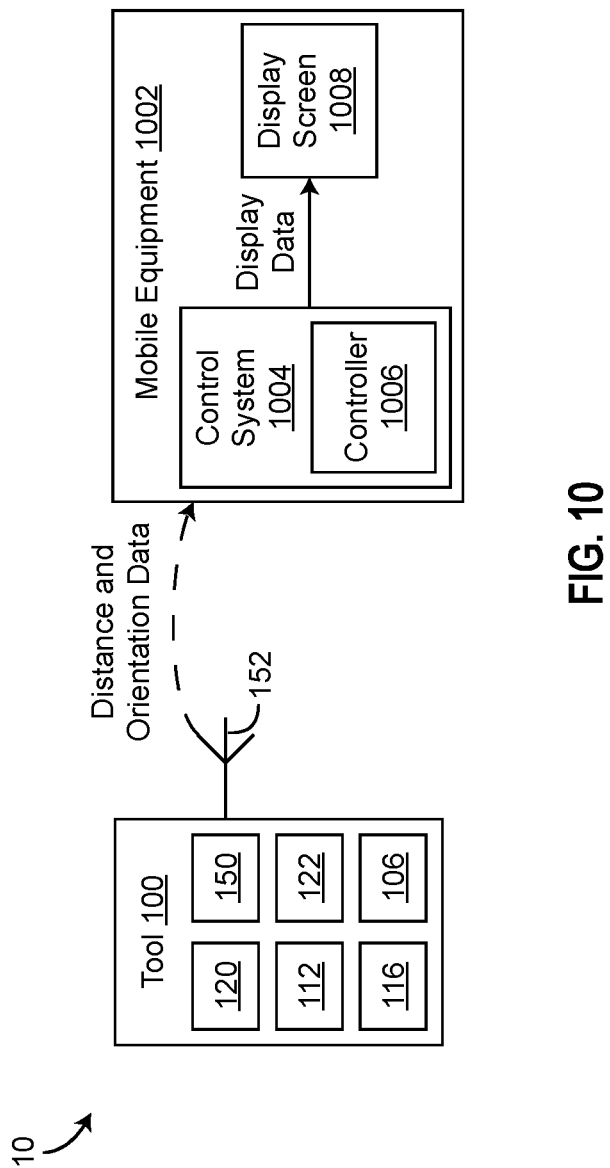
FIG. 10 is a block diagram of the reach and placement tool of FIGS. 1-6 providing sensor data to a control system of mobile equipment for analysis and processing, according to an exemplary embodiment.

Referring now to FIGS. 8-10, various control architectures or infrastructures of the reach and placement system 10 are shown, according to different embodiments. It should be understood that while FIGS. 1-7 describe the functionality of the reach and placement system 10 implemented locally at a handheld device such as the reach and placement tool 100 (e.g., or the controller 150 thereof), various functionality, techniques, steps, etc., described herein can be implemented across multiple devices, systems, processing units, processors, circuitry, etc., and the above description should not be understood as limiting.

Referring FIGS. 8-10, the reach and placement tool 100 can include a wireless transceiver 152. The wireless transceiver 152 can be configured to facilitate wireless communication between the reach and placement tool 100 and an external device via Bluetooth, LoRa, Zigbee, WiFi communications, cellular communications, radio communications, etc. Referring particularly to FIG. 8, the reach and placement tool 100 is configured to communicate with a smartphone or personal computer device 802 using the wireless transceiver 152. The reach and placement tool 100 may transmit or provide any distance or orientation data (e.g., measurements, sensor data, etc.) that is obtained by the reach and placement tool 100. For example, the reach and placement tool 100 may wirelessly transmit (using the wireless transceiver 152) any sensor data obtained from the reach and placement tool 100 to the personal computer device 802. The personal computer device 802 can include processing circuitry, a processor, memory, etc., similar to or the same as the controller 150 described in greater detail above with reference to FIG. 6. The personal computer device 802 obtains any of the sensor data from the reach and placement tool 100 (e.g., the distance and orientation data) and can be configured to perform any of the functionality of the controller 150 as described in greater detail above with reference to FIG. 6. For example, the personal computer device 802 may be configured to perform any of the functionality of the envelope database 608, the coordinate manager 610, the range manager 612, and/or the output manager 614. The personal computer device 802 may be configured to provide point or polar coordinates, display data, etc., that is determined based on the distance and orientation data to the reach and placement tool 100. In this way, the reach and placement tool 100 can function as a rangefinder device for obtaining distance and orientation data, and the personal computer device 802 can be configured to analyze or process the distance and orientation data provided by the reach and placement tool 100. The personal computer device 802 may be a smartphone of the worker 18.

Referring to FIG. 9, the reach and placement tool 100 may alternatively provide the distance and orientation data to a cloud computing system 902. The reach and placement tool 100 can provide the distance and orientation data to the cloud computing system 902 using the wireless transceiver 152. In other embodiments, the reach and placement tool 100 is configured to provide the distance and orientation data to the personal computer device 802 which is configured to relay the distance and orientation data to the cloud computing system 902. In other embodiments, the personal computer device 802 is configured to determine point coordinates, display data, etc., using the functionality of the controller 150 described in greater detail above with reference to FIG. 6 and provide the point coordinates of various locations or points of interest, the display data, etc., to both the reach and placement tool 100 and the cloud computing system 902.

Referring still to FIG. 9, the cloud computing system 902 can include processing circuitry, memory, processors, etc., that are positioned at a single remote device (e.g., a network device, a device connected to the Internet, etc.) or at multiple distributed devices (e.g., multiple network devices, multiple devices with Internet connectivity, a server, etc.). The cloud computing system 902 can be configured to perform the functionality of the controller 150 as described in greater detail above with reference to FIG. 6. More specifically, the cloud computing system 902 can be configured to perform any of the functionality of the envelope database 608, the coordinate manager 610, the range manager 612, and/or the output manager 614 as described in greater detail above with reference to FIG. 6. In this way, the reach and placement tool 100 can be configured as a sensor unit or a rangefinder that uploads measurements or results to the cloud computing system 902 for further processing and analysis (e.g., to generate the point coordinates, the display data, etc.). The point coordinates or display data can be provided from the cloud computing system 902 to the reach and placement tool 100 and/or the smartphone 802 for display.

Referring now to FIG. 10, in another embodiment, the reach and placement tool 100 functions as a rangefinder or sensing device to obtain measurements (e.g., the distance and orientation data) and provides the measurements to a control system 1004 of mobile equipment 1002. The mobile equipment 1002 can be a cherry picker, a telehandler, an MEWP, etc. The control system 1004 of the mobile equipment 1002 can include a controller 1006. The controller 1006 may be structurally similar to the controller 150 as described in greater detail above with reference to FIG. 6 and may include processing circuitry, a processor, memory, etc. The controller 1006 of the mobile equipment 1002 can be configured to perform any of the functionality of the controller 150 as described in greater detail above with reference to FIG. 6 using the distance and orientation data provided by the reach and placement tool 100. The controller 1006 may generate display data using the distance and orientation data (e.g., indicating which of several points of interest are reachable by the mobile equipment 1002) which can be provided on or displayed on a display screen 1008 or the mobile equipment 1002. The display screen 1008 of the mobile equipment 1002 may be a graphical user interface that is positioned at any of a platform of the mobile equipment 1002, a ground control station of the mobile equipment 1002, a vehicle cab of the mobile equipment 1002, or a personal computing device or a remote controller of the mobile equipment 1002 or an operator of the mobile equipment 1002 (e.g., the personal computer device 802).

It should be understood that the reach and placement tool 100 may be configured to provide the distance and orientation data (e.g., measurements or sensor data obtained by the lasers 106 and/or the orientation sensor 116) to any of the personal computer device 802, the cloud computing system 902, the mobile equipment 1002, etc., wirelessly using the wireless transceiver 152. The mobile equipment 1002, the cloud computing system 902, and the personal computer device 802 can be configured to communicate any of the distance and orientation data, the point coordinates or display data, etc., among each other.

Range and Position Determination System

Boom Lift

Figure 11:
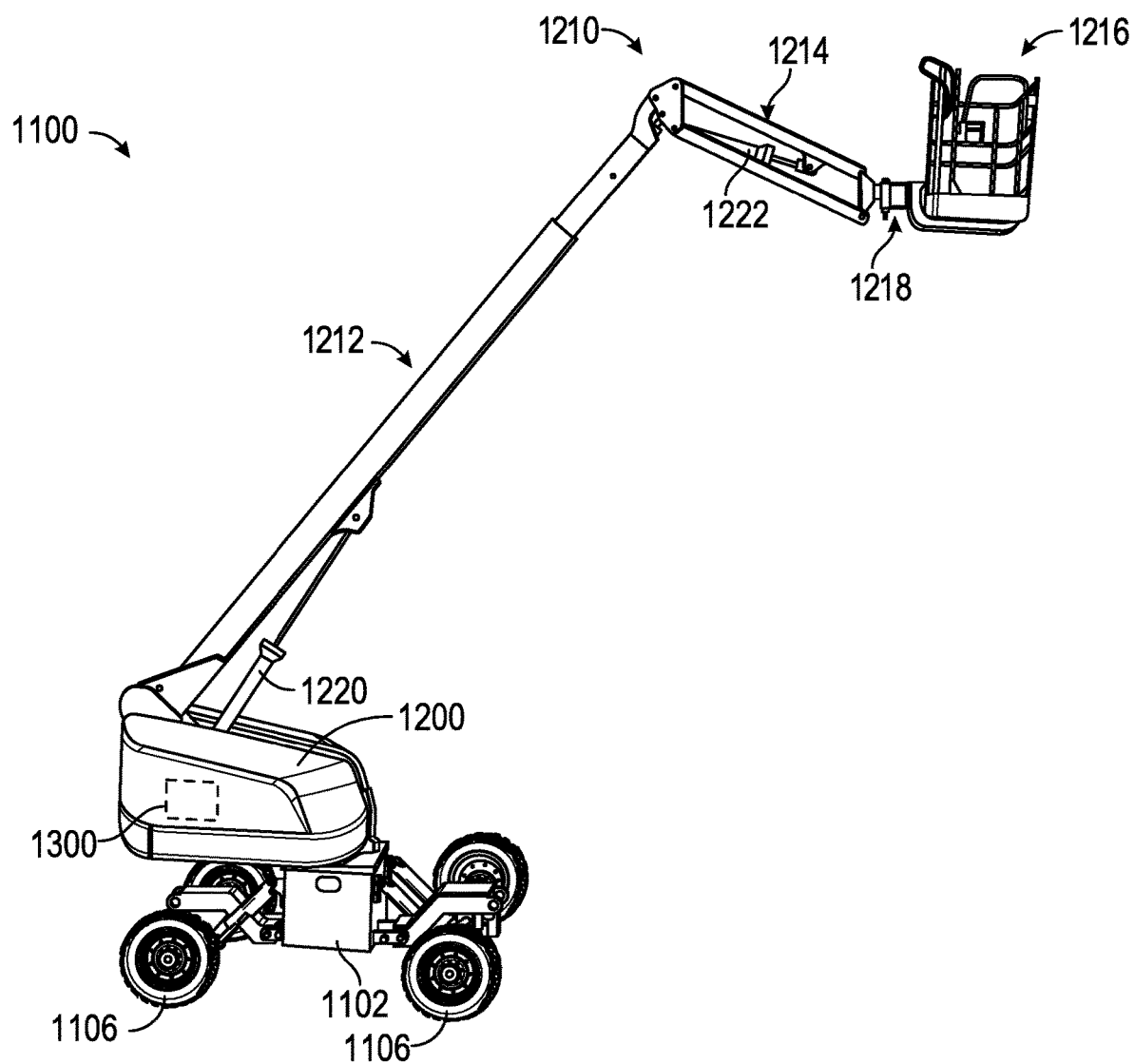
FIG. 11 is a perspective view of a lift machine, according to an exemplary embodiment.

As shown in FIG. 11, a vehicle 1100 includes a chassis, shown as frame 1102, and a plurality of tractive elements, shown as wheel and tire assemblies 1106. In other embodiments, the tractive elements include track elements. According to the exemplary embodiment shown in FIG. 11, the vehicle 1100 is configured as a lift device or machine. As shown in FIG. 11, the lift device or machine is configured as a boom lift. In other embodiments, the lift device or machine is configured as a skid-loader, a telehandler, a scissor lift, a fork lift, and/or still another lift device or machine. As shown in FIG. 11, the frame 1102 supports a rotatable structure, shown as turntable 1200, and a boom assembly, shown as boom 1210. According to an exemplary embodiment, the turntable 1200 is rotatable relative to the frame 1102. According to an exemplary embodiment, the turntable 1200 includes a counterweight positioned at a rear of the turntable 1200. In other embodiments, the counterweight is otherwise positioned and/or at least a portion of the weight thereof is otherwise distributed throughout the vehicle 1100 (e.g., on the frame 1102, on a portion of the boom 1210, etc.).

As shown in FIG. 11, the boom 1210 includes a first boom section, shown as lower boom 1212, and a second boom section, shown as upper boom 1214. In other embodiments, the boom 1210 includes a different number and/or arrangement of boom sections (e.g., one, three, etc.). According to an exemplary embodiment, the boom 1210 is an articulating boom assembly. In one embodiment, the upper boom 1214 is shorter in length than lower boom 1212. In other embodiments, the upper boom 1214 is longer in length than the lower boom 1212. According to another exemplary embodiment, the boom 1210 is a telescopic, articulating boom assembly. By way of example, the upper boom 1214 and/or the lower boom 1212 may include a plurality of telescoping boom sections that are configured to extend and retract along a longitudinal centerline thereof to selectively increase and decrease a length of the boom 1210.

As shown in FIG. 11, the lower boom 1212 has a lower end pivotally coupled (e.g., pinned, etc.) to the turntable 1200 at a joint or lower boom pivot point. The boom 1210 includes a first actuator (e.g., pneumatic cylinder, electric actuator, hydraulic cylinder, etc.), shown as lower lift cylinder 1220. The lower lift cylinder 1220 has a first end coupled to the turntable 1200 and an opposing second end coupled to the lower boom 1212. According to an exemplary embodiment, the lower lift cylinder 1220 is positioned to raise and lower the lower boom 1212 relative to the turntable 1200 about the lower boom pivot point.

As shown in FIG. 11, the upper boom 1214 has a lower end pivotally coupled (e.g., pinned, etc.) to an upper end of the lower boom 1212 at a joint or upper boom pivot point. The boom 1210 includes an implement, shown as platform assembly 1216, coupled to an upper end of the upper boom 1214 with an extension arm, shown as jib arm 1218. In some embodiments, the jib arm 1218 is configured to facilitate pivoting the platform assembly 1216 about a lateral axis (e.g., pivot the platform assembly 1216 up and down, etc.). In some embodiments, the jib arm 1218 is configured to facilitate pivoting the platform assembly 1216 about a vertical axis (e.g., pivot the platform assembly 1216 left and right, etc.). In some embodiments, the jib arm 1218 is configured to facilitate extending and retracting the platform assembly 1216 relative to the upper boom 1214. As shown in FIG. 11, the boom 1210 includes a second actuator (e.g., pneumatic cylinder, electric actuator, hydraulic cylinder, etc.), shown as upper lift cylinder 1222. According to an exemplary embodiment, the upper lift cylinder 1222 is positioned to actuate (e.g., lift, rotate, elevate, etc.) the upper boom 1214 and the platform assembly 1216 relative to the lower boom 1212 about the upper boom pivot point.

According to an exemplary embodiment, the platform assembly 1216 is a structure that is particularly configured to support one or more workers. In some embodiments, the platform assembly 1216 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 1216 includes a control panel (e.g., a user interface, a removable or detachable control panel, etc.) to control operation of the vehicle 1100 (e.g., the turntable 1200, the boom 1210, etc.) from the platform assembly 1216 and/or remotely therefrom. In some embodiments, the control panel is additionally or alternatively coupled (e.g., detachably coupled, etc.) to the frame 1102 and/or the turntable 1200. In other embodiments, the platform assembly 1216 includes or is replaced with an accessory and/or tool (e.g., forklift forks, etc.).

Figure 12:
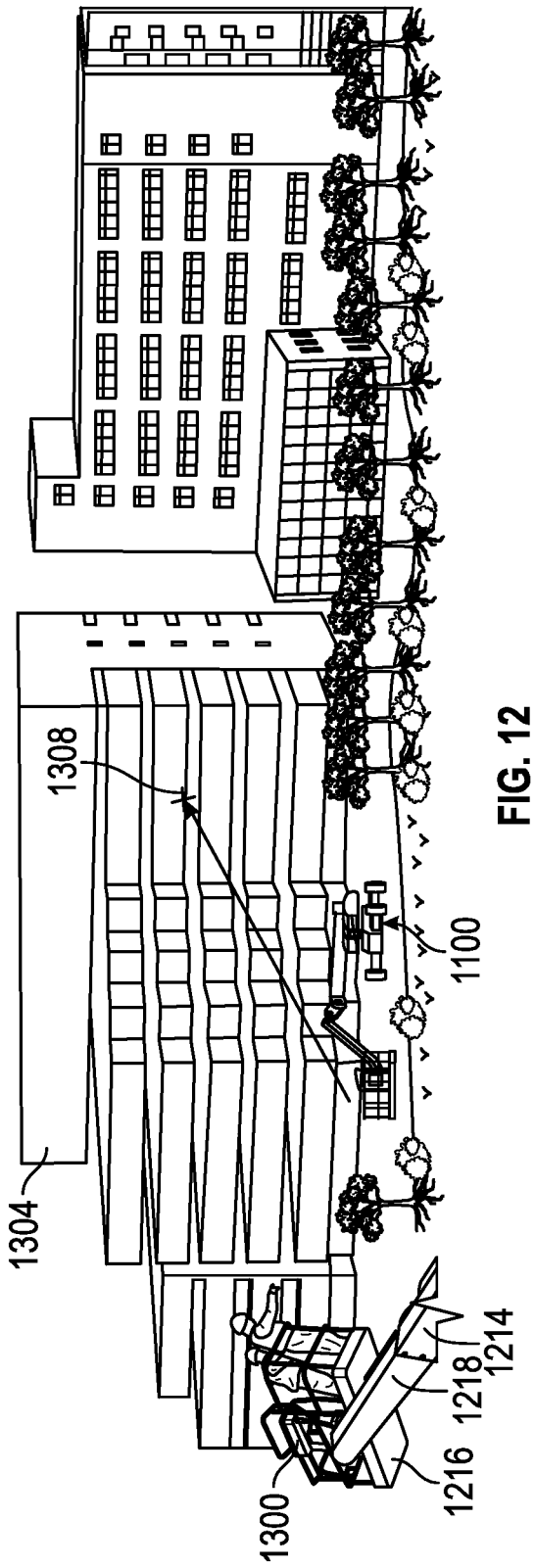
FIG. 12 is a perspective view of a worksite including a vehicle, according to an exemplary embodiment.

The reach and placement system 10 can be implemented for use with the vehicle 1100 as described herein with reference to FIG. 11, or any of the vehicles 1100 as described in greater detail below with reference to FIGS. 35-42. For example, the reach and placement system 10 can be used to determine if the vehicle 1100 can reach any of the points of interest 14 with the boom 1210 prior to positioning and use of the vehicle 1100. In some embodiments, the reach and placement tool 100 stores models of any of the vehicles 1100 (e.g., a boom lift, an articulated reach arm, a refuse vehicle, etc.) described herein with reference to FIGS. 35-42 to determine if the vehicle 1100 can reach a desired location.
First Implementation As shown in FIG. 12, the boom lift 1100 equipped with a range and position determination system 1300 is positioned adjacent a building 1304. A user positioned on the platform assembly 1216 identifies a desired position 1308 on the building using the range and position determination system 1300. In some embodiments, the range and position determination system 1300 is a hand held unit tethered or mounted to the platform assembly 1216. In some embodiments, the range and position determination system 1300 is tethered or mounted to the frame 1102 of the boom lift 1100.

In some embodiments, the range and position determination system 1300 may include components that are not physically tethered to the boom lift 1100 or that include programs or computing solutions provided on a user device (e.g., a smart phone, tablet, etc.).

Figure 13:
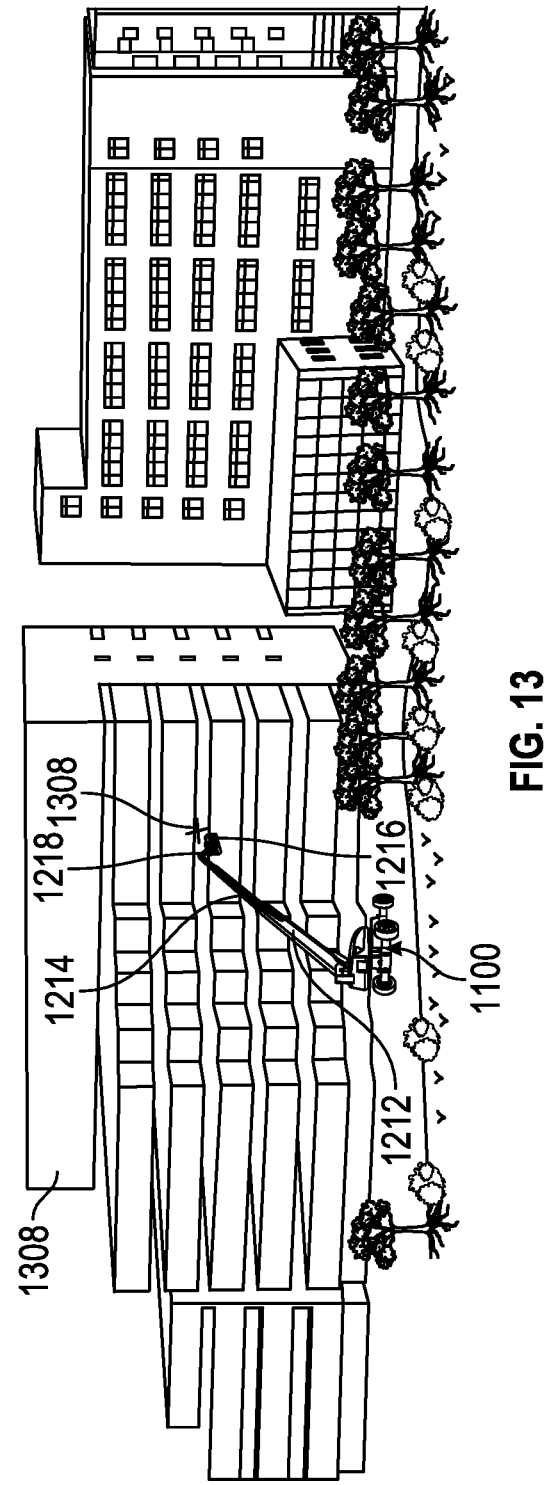
FIG. 13 is a perspective view of the worksite of FIG. 12, according to an exemplary embodiment.

As shown in FIG. 13, once the range and position determination system 1300 has received the desired position 1308, a determination is made in view of other inputs and a notification is provided to the user indicating that the desired position 1308 is acceptable, or that the desired position 1308 is unacceptable. If the notification indicates that the desired position 1308 is acceptable, then the user is allowed to navigate the platform assembly 1216 of the boom lift 1100 to the desired position 1308. In some embodiments, instructions can be provided for navigation to the desired location 1308. Within the context of this disclosure, an "acceptable" desired position 1308 allows the platform assembly 1216 (or other lift device) to be moved to the desired location 1308 while remaining within stability thresholds. An "unacceptable" desired location 1308 would place the platform assembly (or other lift device) outside stability thresholds. As will be discussed below, stability thresholds can include a number of inputs including payload or total weight of the platform assembly 1216 (or other lifting device) including all personnel and equipment, a reach distance (i.e., distance in an x-direction and a y-direction), and a lift distance (i.e., distance in a z-direction).

Figure 14:
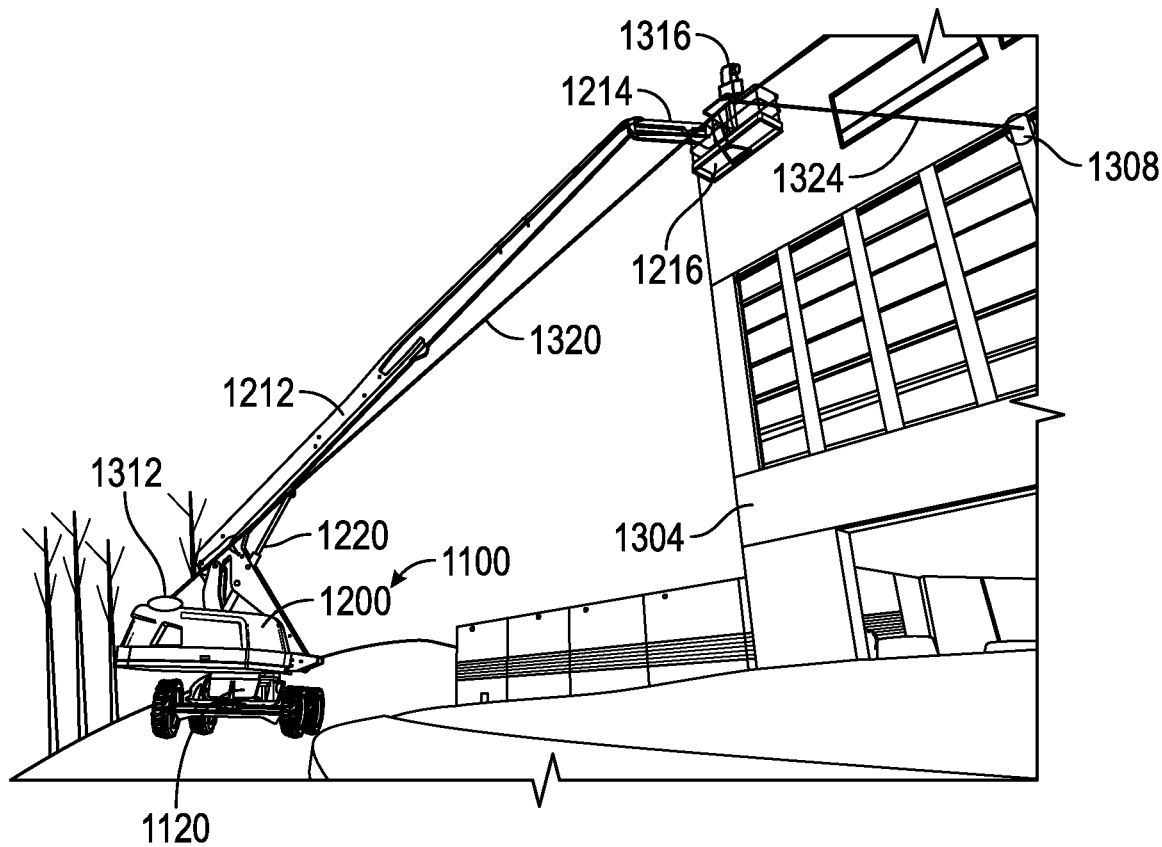
FIG. 14 is a perspective view of the worksite of FIG. 12, according to an exemplary embodiment.

As shown in FIG. 14, the range and position determination system 1300 includes a base unit 1312 coupled to the chassis 1102 or the turntable 1200, and an aiming unit 1316 positioned on the platform assembly 1216. The base unit 1312 is structured to define a Cartesian coordinate field including an x-axis, a y-axis, and a z-axis. The base unit 1312 can locate the relative position of the aiming unit 1316 within the Cartesian coordinate field using a beacon or sensor system (e.g., ultra wide-band position sensors, Bluetooth® beacons, or other sensors). The determination of the relative position of the platform assembly 1216 is shown as line 1320. The base unit 1312 can also receive inputs for a vehicle controller indicative of relative positions of the chassis 1102, the turntable 1200, the lower boom 1212, the upper boom 1214, the jib arm 1218, and/or the platform assembly 1216 that can be used in conjunction with the sensors of the base unit 1312 is determining and defining a current position of the platform assembly 1216 relative to the chassis 1102.

The aiming unit 1316 can be manipulated by the user and aimed at (e.g., using an eyepiece or sight) a desired position 1308 from the platform assembly 1216. The line of sight from the aiming unit 1316 to the desired position 1308 is shown as line 1324. The aiming unit 1316 is structured to determine a Cartesian direction and a distance to the desired position 1308 relative to the platform assembly 1216. The range and position determination system 1300 can then use the relative position of the platform assembly 1216 determined by the base unit 1312 and the relative position of the desired position 1308 determined by the aiming unit 1316 to determine the relative position of the desired position 1308 with respect to the chassis 1102. The range and position determination system 1300 can then determine if the desired position 1308 is acceptable or unacceptable.

Figure 15:
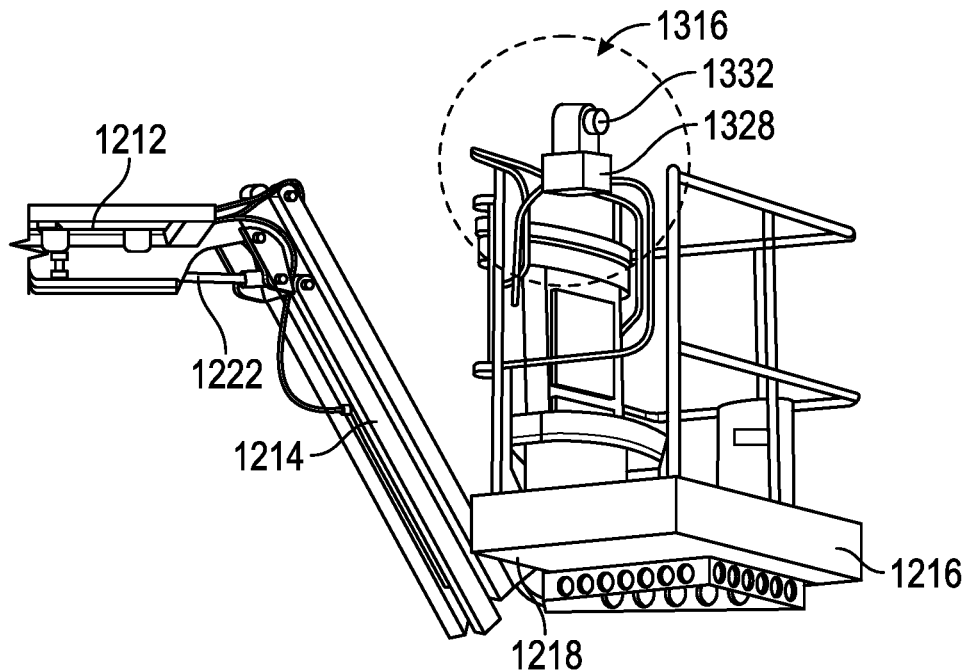
FIG. 15 is a perspective view of a platform assembly of a lift device, according to an exemplary embodiment.

As shown in FIG. 15, the aiming unit 1316 of the range and position determination system 1300 includes a cradle 1328 that is rigidly coupled to the platform assembly 1216, and a sighting device 1332 that is movable relative to the cradle 1328 and includes a sensor array structured to determine the relative position of the desired position 1308 with respect to the base 1328. In some embodiments, the cradle 1328 communicates wirelessly or via a wired connection with the base unit 1312 and the sighting device 1332 communicates wirelessly or via a wired connection with the cradle 1328. In some embodiments, the cradle 1328 is a physical mount for the sighting device 1332 but does not include any control features (i.e., all the controls and communication is provided directly between the sighting device 1332 and the base unit 1312). The cradle 1328 can be rigidly mounted to the platform assembly 1216 in a fixed orientation allowing the sighting unit to be calibrated while seated in the cradle 1328.

Figure 16:
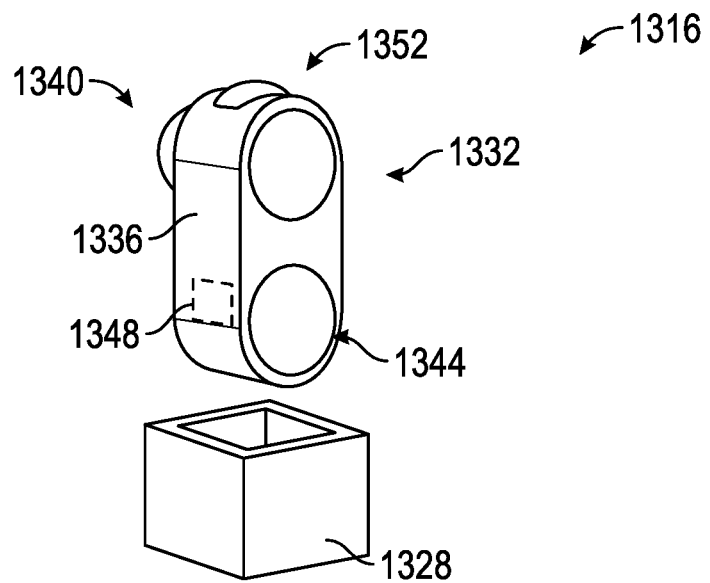
FIG. 16 is a perspective view of a range and position determination system, according to an exemplary embodiment.

As shown in FIG. 16, the aiming unit 1316 includes the cradle 1328 and the sighting device 1332. The sighting device 1332 includes a housing 1336 that supports a sight lens 1340 through which a user can look and identify the desired position 1308, a laser distance meter (LDM) 1344 structured to determine a distance from the sighting device 1332 to the desired position 1308, a inertial measurement unit (IU) 1348 structured to determine an orientation (e.g., a 6-axis IMU including a 3-axis accelerometer and a 3-axis gyroscope) of the sighting device 1332 relative to a calibration orientation defined by the cradle 1328, and a measure button 1352 that allows a user to capture the desired position 1308.

Figure 17:
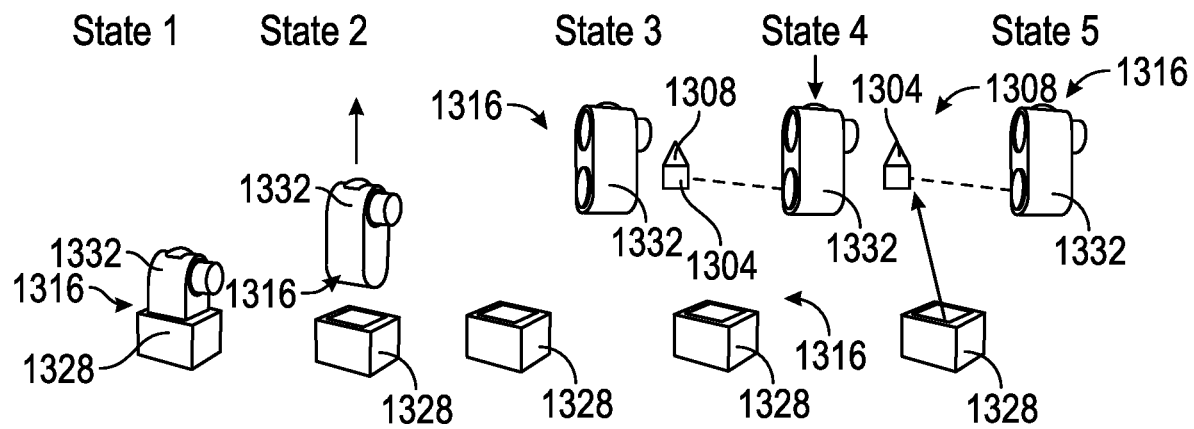
FIG. 17 is a perspective view of the range and position determination system of FIG. 16, according to an exemplary embodiment.

As shown in FIG. 17, use of the aiming unit 1316 includes setting a calibration or a zero position at State 1 with the sighting device 1332 positioned within or engaged with the cradle 1328. In some embodiments, the sighting device 1332 includes a hall sensor, a magnet, or another device that can determine or confirm that the sighting device 1332 is fully mated with and aligned with the cradle 1328. The cradle 1328 can be installed in a predetermined and fixed position that is known by the range and position determination system 1300 such that the calibration or zero position of the sighting device 1332 is the same every time the sighting device 1332 is mated with the cradle 1328. For example, the pitch, yaw, and distance of the sighting device 1332 are all zero relative to the platform assembly 1216 when the sighting device 1332 is mated with the cradle 1328.

At State 2, the user removes the sighting device 1332 from the cradle 1328 and the range and position determination system 1300 activates. Activation includes providing power to the LDM 1344 and the IMU 1348 and any other sensors included in the sighting device 1332. Activation also includes any background initiation and startup operations of the range and position determination system 1300 before measurements can be taken and determinations made.

At State 3, the user looks through the sight lens 1340 and identifies the desired position 1308. In some embodiments, the sight lens 1340 includes a cross hairs or another sight. In some embodiments, the sight lens 1340 includes a visible light laser (e.g., a green laser, a red laser, etc.) that can be seen by the user through the sight lens 1340 and may aid in the identification of the desired position 1308.

At State 4, the user depresses the measure button 1352 and the LDM 1344 and the IMU 1348 begin taking measurements including a distance to the desired position 1308, a pitch angle (i.e., an angle relative to the plane defined by the x-axis and the y-axis), and a yaw angle (i.e., an angle about the z-axis). In some embodiments, the user has a predetermined amount of time to depress the measure button 1352 before the range and position determination system 1300 will enter a sleep state and the process of determining the desired position 1308 must be started over from State 1.

At State 5, the measurements taken in State 4 via the sighting device 1332 and any other inputs or information (e.g., a payload or total weight of the platform assembly 1216) are sent to the base unit 1312. In some embodiments, the sighting device 1332 communicates directly with the base unit 1312. In some embodiments, the sighting device 1332 communicates with the cradle 1328 and the cradle communicates with the base unit 1312.

As shown in FIG. 18, in some embodiments, the information sent to the base unit 1316 includes distance and orientation information of the sighting device 1332 relative to the cradle 1328. For example, the sighting device 1332 may be 3.4 feet away from the cradle, with a pitch of 10 degrees, and a yaw of 8 degrees. The overall distance, pitch, and yaw sent to the base unit 1316 may account for the distance, pitch, and yaw between the sighting device 1332 and the cradle 1328. For example, the distance from the cradle 1328, or the zero point, to the desired position 1308 may be 35.4 meters, at a pitch of 2.1 degrees, and a yaw of 0.5 degrees. The pitch and yaw angle may be relative to a fixed axis system defined by the cradle 1328. For example, the pitch and yaw may both be defined relative to the y-axis. FIG. 19 shows exemplary fixed axis for the yaw of the range and position determination system 1300 and FIG. 20 shows exemplary fixed axis for the pitch of the range and position determination system 1300.

Figure 21:
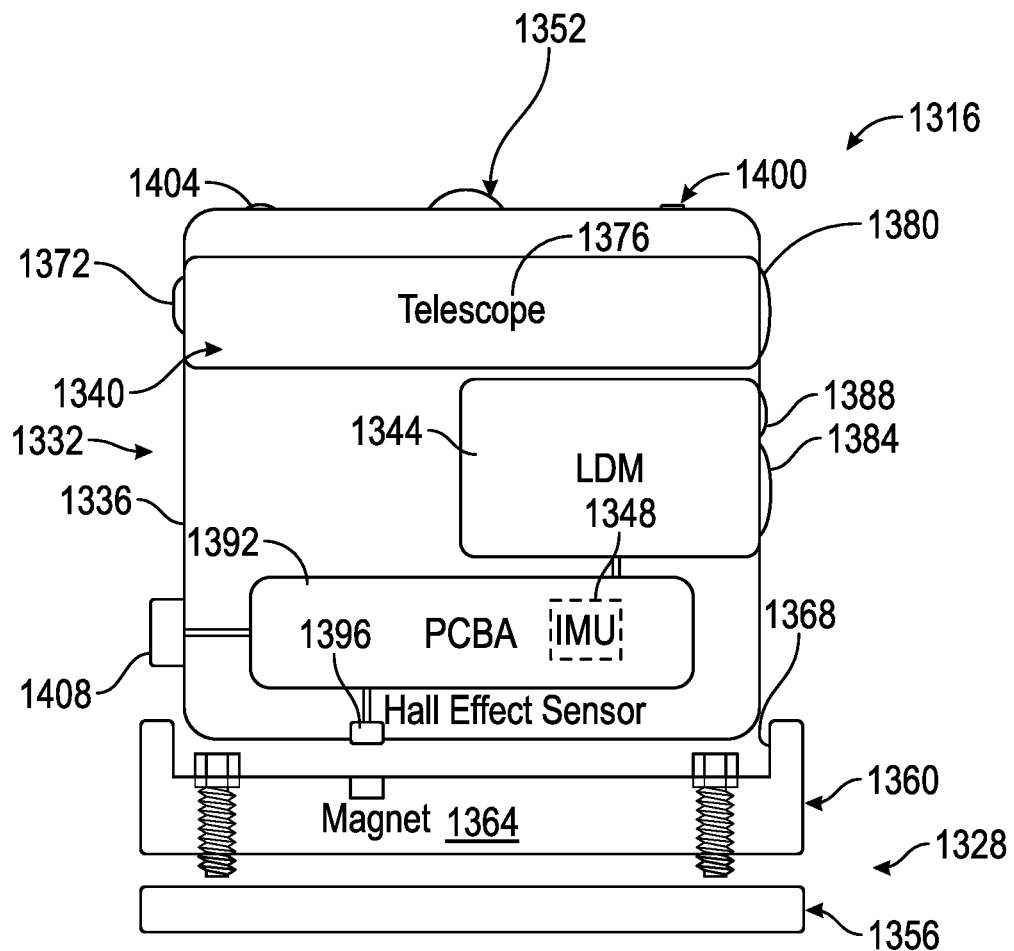
FIG. 21 is a schematic view of the range and position determination system of FIG. 16, according to an exemplary embodiment.

As shown in FIG. 21, the aiming unit 1316 includes the sighting device 1332 and the cradle 1328. The cradle 1328 includes a mounting bracket 1356 and a carriage 1360 that together rigidly mount the cradle 1328 to the platform assembly 1216. In some embodiments, the mounting bracket 1356 and the carriage 1360 are fastened together about a component (e.g., a guard rail or mounting arm) of the platform assembly 1216 via compression. In some embodiments, the mounting bracket 1356 is adhered, welded, or otherwise fixed to the platform assembly 1216, and the carriage 1360 is fastened or engaged with the mounting bracket 1356. The cradle 1328 also includes a magnet 1364 positioned within or on the carriage 1360. An alignment feature in the form of a recess 1368 is formed in the carriage 1360 to provide easy engagement and alignment of the sighting device 1332 with the cradle 1328. In some embodiments, the sighting device 1332 enjoys a loose interference fit with the recess 1368. In some embodiments, the alignment feature includes a protrusion, a slot, a hook and loop fastener, magnets, a ball detent, or another alignment features, as desired.

The sighting device 1332 includes the housing 1336, the sight lens 1340, the LDM 1344, the IMU 1348, and the measure button 1352. The sight lens 1340 includes an eyepiece lens 1372 that can include a cross hairs or another guide, a telescope 1376, and an objective lens 1380. In some embodiments, the magnification power of the sight lens 1340 is between about 5× and about 10×. The LDM 1344 includes a receiver 1384 and a transmitter 1388 structured to send and receive laser energy to determine a distance between the sighting device 1332 and the desired position 1308. In some embodiments, the range of the LDM 1344 is about one to one-hundred meters with an accuracy of about +/−0.5 meters. The IMU 1348 is a chip or chipset, in some embodiments, that resides on a printed circuit board assembly (PSBA) 1392. In some embodiments, the IMU 1348 is a 6-axis IMU with an accuracy of about +/−1 degree within 10 seconds of removal from the cradle 1328. The PSBA 1392 also includes other computing and processing components of the range and position determination system 1300. A hall effect sensor 1396 is arranged in communication with the PSBA 1392 to provide a signal indicative of the adjacency of the hall effect sensor 1396 top the magnet 1364 of the cradle 1328. The hall effect sensor 1396 allows the sighting device 1332 to recognize when it is arranged in the cradle 1328 and when it is removed for use. In addition to the measure button 1352, the sighting device 1332 includes a calibration button 1400 that can be used while the sighting device 1332 is fully seated in the cradle 1328 to re-zero the distance, pitch, and yaw measurements, and/or to provide other programming functions. For example, the calibration button 1400 may be used to calibrate a distance, pitch, and/or yaw between the aiming unit 1316 to the base unit 1312. A status LED 1404 can be used to relay information to the user (e.g., ON, OFF, error messages or codes, etc.). A interface connector 1408 provides communication from the PSBA 1392 to the base unit 1312. The interface connector 1408 is a wired connection, but can be replaced with a telematics device, or another wireless communication device to provide wireless communication between the aiming unit 1316 and the base unit 1312.

Figure 22:
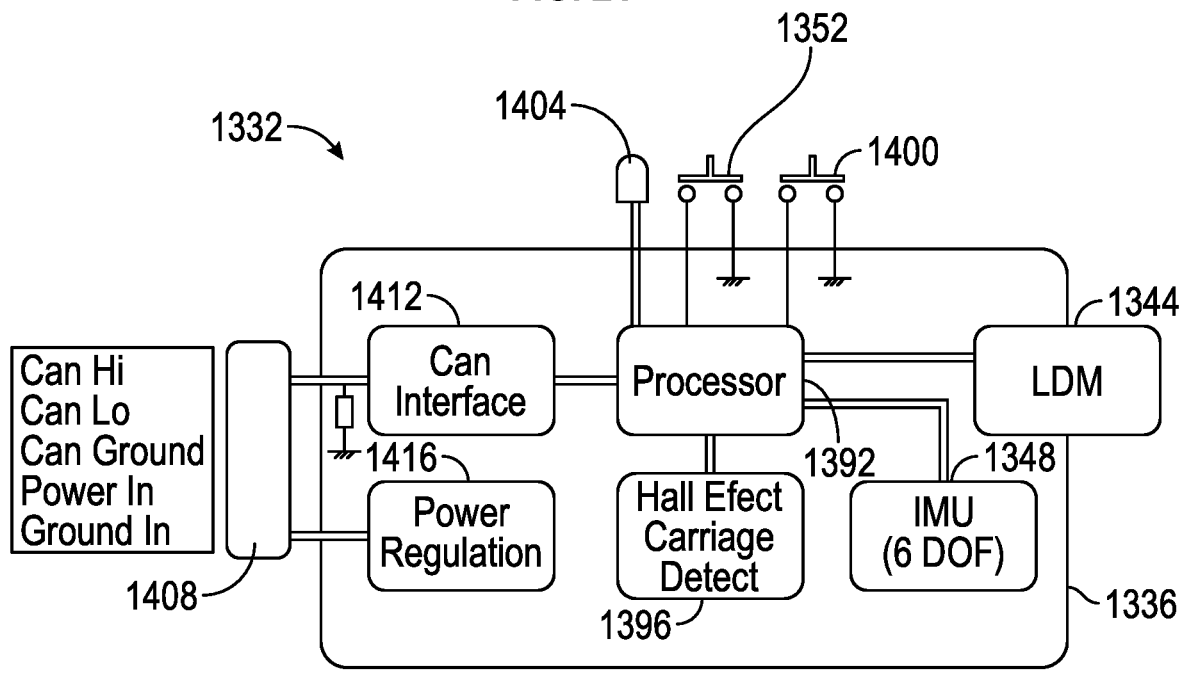
FIG. 22 is a schematic view of the range and position determination system of FIG. 16, according to an exemplary embodiment.

As shown in FIG. 22, another schematic of the sighting device 1332 includes a CAN interface 1412 and a power regulation device 1416 coupled to the interface connector 1408. The CAN interface 1412 can parse information from the PSBA 1392 onto dedicated channels (e.g., CAN HI, CAN LO, etc.) for use by the base unit 1312. The power regulator device 1416 may receive electrical power from the interface connector 1408 (e.g., CAN GROUND, POWER IN, GROUND IN, etc.) and condition and/or distribute the power to the components of the sighting device 1332.

As shown in FIG. 23, the status LED 1404 can include a number of communication modes. For example, when the status LED is off, it indicates that the sighting device 1332 is off or not active. A solid green light may indicate the sighting device 1332 is in the cradle 1328 and ready for use. A solid yellow light may indicate that the sighting device is mounted in the cradle 1328 but the platform assembly 1216 is moving above a threshold and the range and position determination system 1300 is not ready for use. A slow blinking green light may indicate that the sighting device 1332 is removed from the cradle 1328 and ready for identification of a desired position 1308. A solid red light may indicate that the sighting device 1332 has been removed from the cradle 1328 but that the time has expired for detecting a desired position 1308 and that the sighting device 1332 must be returned to the cradle 1328. A fast blinking green light may indicate that the measurements were successful and that the desired position 1308 is determined. A fast blinking red light may indicate that measurements were not successful and that the sighting device 1332 should be returned to the cradle 1328 (e.g., State 1).

As shown in FIG. 24, a cable 1420 for connecting the aiming unit 1316 to the base unit 1312 includes a first connector 1424 structured to connect to the interface connector 1408 of the sighting device 1332, and a second connector 1428 structured to connect to the base unit 1312. In some embodiments, the second connector 1428 couples to a telematics device positioned on the platform assembly 1216 or another communications device and communication is provided between the base unit 1312 and the aiming unit 1316. In some embodiments, the cable 1420 is a 5 pin M12 Turck style. The cable 1420 can be a coiled cable such as Topcon p/n 1011727-01 CBL, TURCK RSC RKC 5732-3M. Communication between the aiming unit 1316 and the based unit 1312 can be J1939 compatible CAN bus, and 8 data byte PGN messages can be utilized.

As shown in FIG. 25, in some embodiments, an error determination system is used to inhibit building angle interference with the platform assembly 1216. Reported IMU pitch and yaw angles will include some amount of error. The magnitude of error will depend on IMU 1348 quality and duration of time allowed for user measurement. The errors may be larger with angled or irregular shaped buildings for example. In some embodiments, the sighting device 1332 senses multiple points adjacent to the desired position 1308 to improve the perception of the target shape.

In some embodiments, the platform assembly 1216, the cradle 1328, and/or the sighting device 1332 are fitted with location devices such as a GPS and/or GNSS receiver to improve the positional accuracy of the range and position determination system 1300. The integration of a GNSS receiver (rover) into the sighting device 1332 along with the LDM 1344, the IMU 1348, and other components can improve positional accuracy and the accuracy of the desired position 1308. Another GNSS receiver (base) can be installed in the base unit 1312 or on the turntable 1200. Both GNSS receivers can communicate over CAN, allowing to use local RTK. The system can measure in real-time the relative position of the platform assembly 1216 within one centimeter of accuracy. Dual GPS systems may allow the range and position determination system 1300 to accurately measure height of the platform assembly 1216 and the true yaw angle.

The range and position determination system 1300 provides accurate turntable 1200 to platform assembly 1216 position without requiring length & angle sensors in the machine. Accurate offset positioning is provided by the range and position determination system 1300. Using the sighting device 1332, the user can point it to a desired position and press the measure button 1352 to prompt the range and position determination system 1300 calculates geo coordinates of the desired position 1308. In some embodiments, the desired position includes local XYZ, (lat, lon, alt), or (North, East, Up). In some embodiments, the range and position determination system 1300 utilizes geofencing to automatically detect and notify the user of approaching hazards (e.g., power lines). The hazards could be predefined before work or use of the range and position determination system 1300 begins. Use of the range and position determination system 1300 can provide improved jobsite plan execution. Reach coordinates and ranges from jobsite can allow for optimization of equipment use, resulting in fewer moves of the vehicle 1100. Having sets of points of interest the range and position determination system 1300 can calculate an optimal position of the boom lift 1100 before extending and positioning. In some embodiments, wind detection is used as an input to the system. In some embodiments, the range and position determination system 1300 automatically identifies if the lift device can reach the desired position 1308 that was out of reach before and provides a relocation instruction to move the chassis 1102 if the user wants to reach the desired position 1308 that is out of reach at the current chassis 1102 position. The desired position 1308 coordinates could be saved and used to detect new chassis 1102 position. In some embodiments, the range and position determination system 1300 is connected to a network via a telematics device including a cellular modem or another connectivity device and a remote real-time monitoring of current position of the lift device can be provided. A third party mapping service (e.g., Google® map layer) can be provided with current placement of the lift device. The network connectivity can also be used to log position and orientation information of the vehicle 1100 during a work day with associated timestamps allowing for the analysis of data. It is possible to measure how much time spent for each point of interest. The range and position determination system 1300 can also determine an absolute height allowing the lifting device to reach to the same absolute height from different ground heights.

Second Implementation

Figure 26:
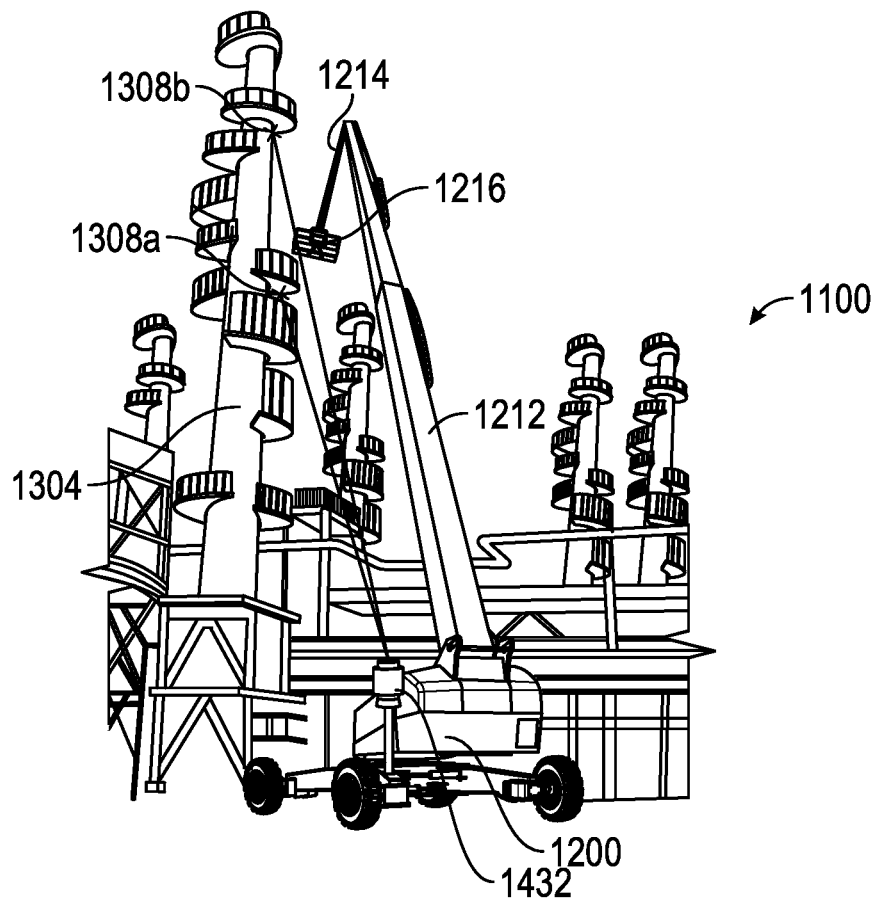
FIG. 26 is a perspective view of a worksite including a vehicle with a lift device and a range and position determination system, according to an exemplary embodiment.
Figure 27:
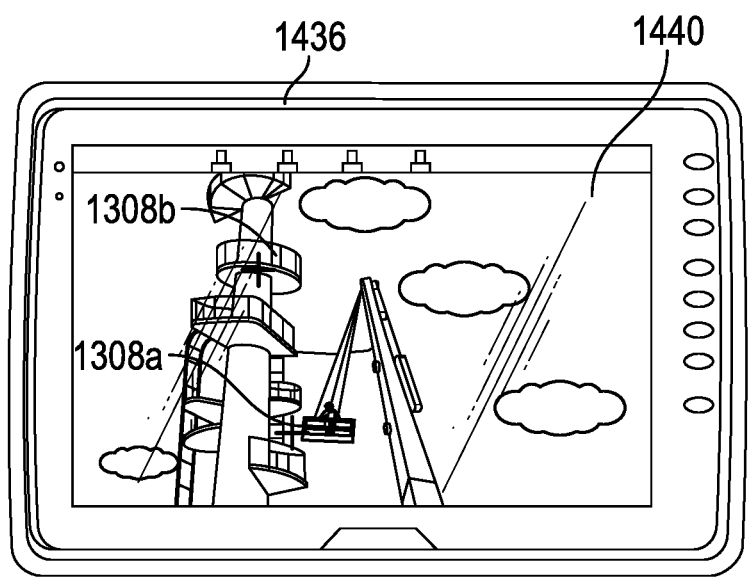
FIG. 27 is a front view of an HMI of the range and position determination system of FIG. 26, according to an exemplary embodiment.

As shown in FIGS. 26 and 27, another embodiment of the range and position determination system 1300 includes a robotic total station (RTS) 1432 to generate a digital scan or map of a work area 1304 and allow the user to select the desired position 1308*a* or 1308*b* from a GUI 1440 generated on a human machine interface (HMI) 1436.

The range and position determination system 1300 provides for an operator to identify a target workspace or desired position 1308 and have the range and position determination system 1300 first advise if the user will be able to reach the desired position 1308 from the current chassis 1102 position. Similar to the first implementation discussed above, the range and position determination system 1300 links the known chassis 1102 location to a defined work envelop to make an acceptable or unacceptable (e.g., GO or NO-GO) determination.

If the range and position determination system 1300 determines a "GO" status, then a communication is provided to the user to proceed as normal since the product, location and reach envelop all agree. If the range and position determination system 1300 determines a "NO-GO" status, then a communication is provided to advise that the user should reposition the vehicle 1100 using machine drive/maneuvering.

The range and position determination system 1300 can also advise what coordinates and/or associated machine inputs are necessary for the user to reach their desired position 1308*a* or 1308*b*. The HMI 1436 can present an image of the work area 1304 with an associated 'xyz' Cartesian system that allows the user to select a desired position 1308*a* or 1308*b* (e.g., a point in space) and deliver the coordinates necessary to reach the desired position 1308*a* or 1308*b* given the incumbent machine's control software. The HMI 1436 and the range and position determination system 1300 can provide "semi-autonomous" or operator-assisted motion and/or boom positioning. In some embodiments, operator-assisted motion may include a user input via the HMI 1436 that allows the range and position determination system 1300 or another system of the boom lift 1100 to move to the desired position 1308*a* or 1308*b*. For example, a foot switch may be positioned within reach of the user, and depression of the foot switch engages the range and position determination system 1300 and allows automated movement to the desired position 1308*a* or 1308*b*. The user can select, via the HMI 1436, which desired position between 1308*a* and 1308*b* and selectively allow movement of the boom lift 1100. In other words, unloading the foot switch would result in movement of the boom lift being inhibited. In this way, the user selectively allows or inhibits movement on the boom lift 1100 and the boom lift 1100 provides the movement in response to the input of the user. In some embodiments, the HMI 1436 that provides operator-assisted motion includes a joystick, a display, a hand operated switch, a button, or another actuator that provides an allow movement command, or an inhibit movement command. In some embodiments, the display of the HMI 1436 includes a touch screen and the user can engage and allow movement via manipulation of the touch screen.

In some embodiments, the HMI 1436 provides visual instructions to the user to move the boom lift 1100 to the desired position 1308*a* or 1308*b*. In some embodiments, the HMI 1436 includes a joystick and a display that provides instructions for manipulation of the joystick. For example, directional arrows including direction and magnitude could be displayed. In another example, a light ring surrounding the joystick may indicate which direction to manipulate the joystick. Multiple joysticks, buttons, actuators, foot pedals, and other controls can be provided and coordinated for manipulation. The directions provided to the user may be adaptive and conveyed from the users perspective such that the directions are easily interpreted by the user regardless of the orientation of the boom lift 1100. For example, if the user needs to push forward on the joystick to create a desired movement, "forward" is relative to the user, not necessarily to the machine.

In some embodiments, the user defines via the range and position determination system 1300 the first desired position 1308*a* and additionally any "up and over" obstacle or requirement. The desired position 1308*a* and the obstacles are used in conjunction with the current machine chassis location to determine feasibility and the resultant Go, or NO-GO status.

The Robotic Total Station (RTS) 1432 is a building construction system that is able to remotely measure distances and position. The RTS 1432 uses horizontal and vertical angle encoders along with a laser range meter(s) to determine distance and angles relative from a known point. The RTS 1432 is mounted to the turntable 1200 of the boom lift 1100, but could also be mounted in other positions. In some embodiments the RTS 1432 includes a +/−5 degree self-leveling range which matches the tilt range of using the boom lift 1100. The RTS 1432 includes a camera system built into the optical path so the user is able to see where the RTS 1432 is pointing and the user can easily and remotely select the desired positions 1308*a* or 1308*b* to be measured via the GUI 1440 on the HMI 1436. This provides simplicity of use so the user can quickly control the RTS 1432 from the platform assembly 1216 of the boom lift 1100.

As shown in FIGS. 28A-H, the range and position determination system 1300 allows the user to identify desired positions 1308*a-c* (e.g., more than three or less than three desired positions are contemplated). As shown in FIG. 28A, the RTS 1432 is mounted on the chassis 1102 of the boom lift 1100. In FIG. 28B, the user activates the RTS 1432 using the HMI 1436. Then, as shown in FIGS. 28C-E, the user can pan around the GUI 1440 displayed on the HMI 1436 and select desired positions 1308*a-c*. As shown in FIG. 28F, once all the desired positions 1308*a-c* are selected, the user finalizes the session via the HMI 1436 and the range and position determination system 1300 generates a work area 1308*d* within which work is to be performed. The work area will include as many of the desired positions 1308*a-c* as possible. In the example shown in FIGS. 28A-H, all three desired positions 1308*a-c* fit within the work area 1308*d* such that only one chassis position is required to access all three desired positions 1308*a-c*. In some embodiments, more than one work area 1308*d* may be generated. As shown in FIG. 28G, the range and position determination system 1300 generates a target chassis location 1444 associated with the work area 1308*d*. The user can then drive the boom lift chassis to the target chassis location 1444. In some embodiments, the target chassis location 1444 is provided via an augmented reality GUI 1440 of the HMI 1436, a virtual reality GUI 1440 of the HMI 1436, or via a laser. As shown in FIG. 28H, once the chassis 1102 is aligned with the target chassis location 1444, the range and position determination system 1300 provides a GO status for all three desired positions 1308*a-c* and the boom lift 1100 can be used to physically provide access to the three desired positions 1308*a-c* via the platform assembly 1216. In some embodiments, all actions represented in FIGS. 28A-H can be performed via the HMI 1436 by the user positioned within the platform assembly 1216.

The movement and positioning of the platform assembly 1216 at high elevations is challenging. At extreme heights, small movements at the chassis 1102 of the boom lift 1100 can cause large movements of the platform assembly 1216. Because of this, the positioning of the platform assembly 1216 relative to a building 1304 or worksite 1304 is a slow task. The range and position determination system 1300 improves the ability of the user to move the chassis 1102 efficiently.

As shown in FIGS. 29-31, the RTS 1432 can communicate with a beacon 1448 (e.g., a cateye prism) attached to the platform assembly 1216. The beacon tracking capabilities allow for an automatic, smoother, and faster process of getting the platform assembly 1216 to the right position for the user to complete tasks. Location information of the beacon 1448 (and therefore the platform assembly 1216) are tied into the boom lift's 10 hydraulic system to quickly and smoothly move the user on the platform assembly 1216 to the desired position 1308a. In some embodiments, the beacon 1448 is mounted on the underside of the platform assembly 1216 and the RTS 1432 tracks the beacon 1448 and calculates the position of the platform assembly 1216 relative to the chassis 1102 and the building 1304/desired positions 1308a-c/work area 1308d. The beacon 1448 is used to determine the current location or position of the platform assembly 1216.

Figure 32:
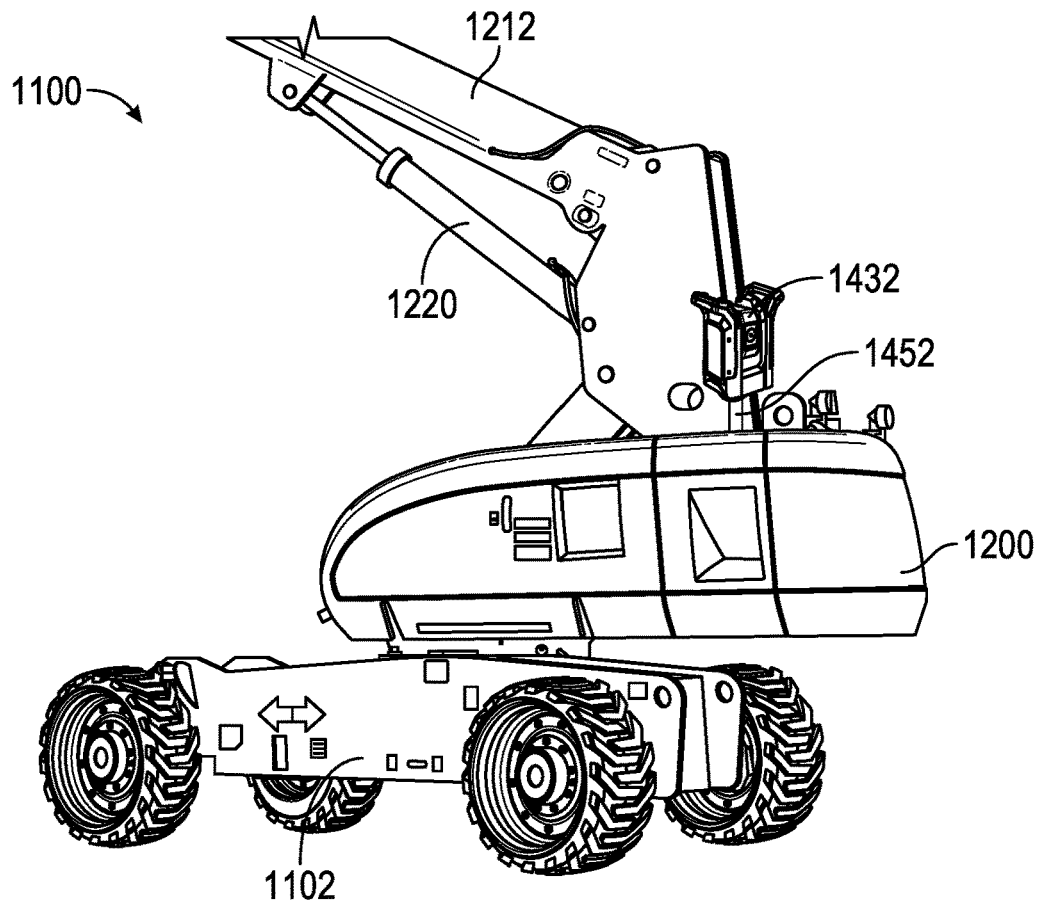
FIG. 32 is a perspective view of the range and position determination system of FIG. 26, according to an exemplary embodiment.
Figure 33:
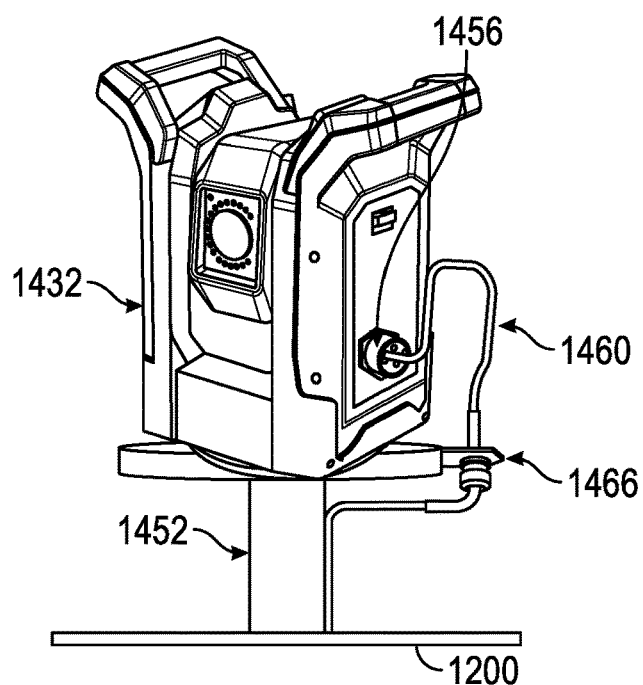
FIG. 33 is a perspective view of the range and position determination system of FIG. 26, according to an exemplary embodiment.

As shown in FIGS. 32 and 33, a bracket pedestal 1452 can mount the RTS 1432 to the chassis 1102, turntable 1200, or other component of the boom lift 1100. The bracket 1452 can include a ⅝-11 male thread to attach RTS 1432 to the bracket 1452. The relative location of the center of the bracket 1452 to the center rotation pivot of the turntable 1200 is used to determine lift positon relative to the building 1304 being measured. The bracket 1452 also includes a power and data connector 1456 that connects to the RTS 1432, a power cable 1460, and a strain relief 1466.

The RTS 1432 may run on an internal battery that must be charged daily. This is not the preferred solution for boom lifts 1100 and a power connector can be added to the side of the RTS 1432 to receive power from the boom lift 1100 using the existing battery door. A drop down voltage regulator could be positioned in the boom lift 1100 or in a battery box cavity. The strain relief 1466 supports the power cable 1460 to allow the RTS 1432 to freely spin around the bracket 1452.

In some embodiments, the HMI 1436 is a 7 inch rugidized touchscreen display that is use by the user to control the functionality of the RTS 1432. Communication between the HMI 1436 and the RTS 1432 can be provided over Wi-Fi®. However, Wi-Fi® around heavy equipment presents challenges, especially at the extreme ranges that are possible for the Ultra Boom Lifts that can extend to 185 feet. Hard wiring the HMI 1436 and the RTS 1432 can also be provided (e.g., via USB or another system). The data communicated between the HMI 1436 and the RTS 1432 includes both control of instrument (e.g., boom lift controls) and position data (e.g., from the range and position determination system 1300) which includes small packets of data but also video data of camera feeds for the user to select desired positions 1308a-c to measure.

In some embodiments, the range and position determination system 1300 includes all the machine types (e.g., the boom lift, scissor lifts, telehandlers, any other vehicle or apparatus that includes a lift device) and offset measurements that are needed to ensure accurate and precise measurement.

Determination of Acceptability of Desired Position

Figure 34:
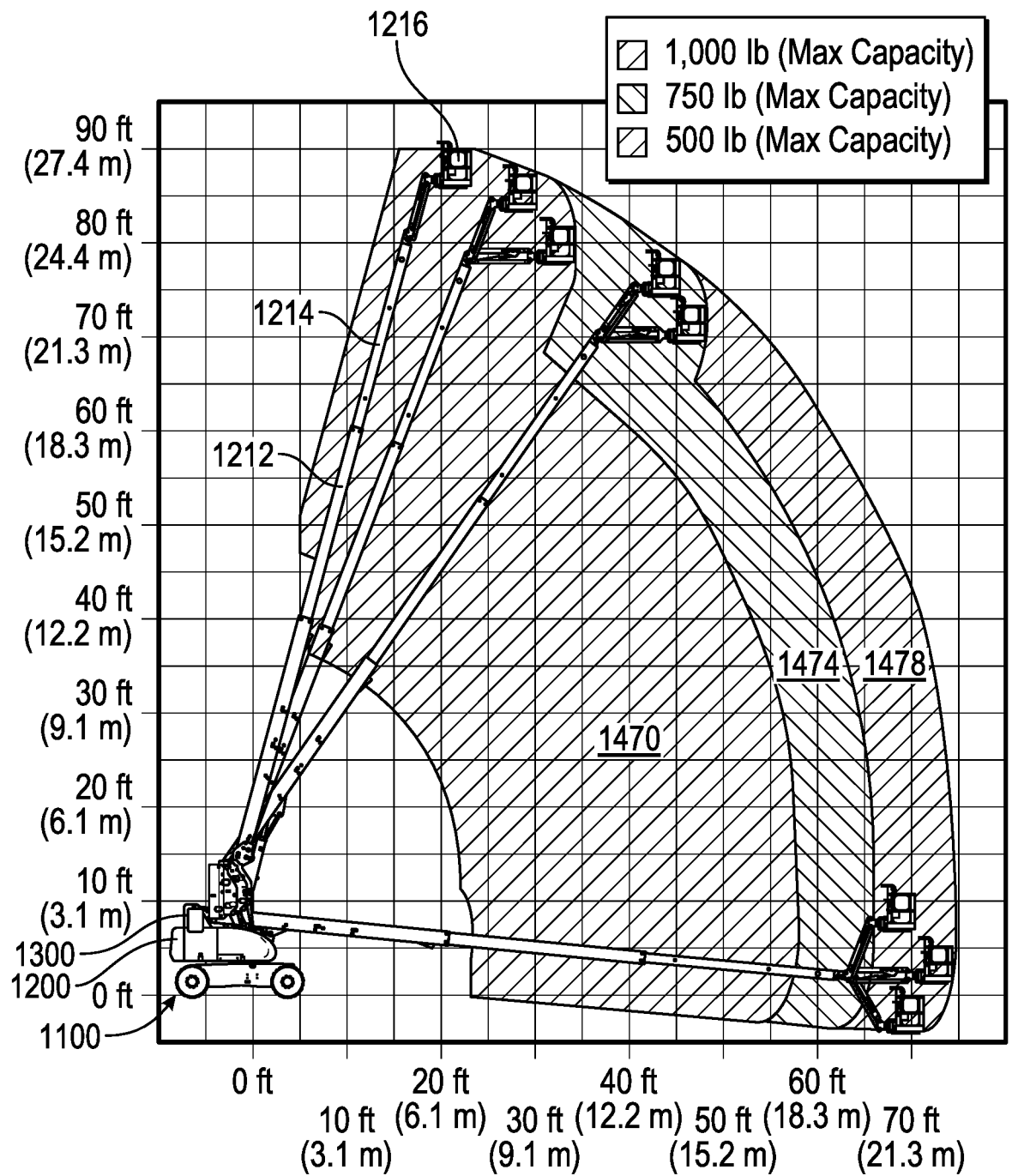
FIG. 34 is a load map of a boom lift used by the range and position determination systems of FIGS. 20 and 30, according to an exemplary embodiment.

The implementations discussed above can be used to determine the current position of the lift device (e.g., the platform assembly 1216) and the desired position. The range and position determination system 1300 includes load maps (e.g., see FIG. 34) that can be used to determine if the lift device is capable of moving to the desired positions 1308 from the current position within stability thresholds. If the lift device can successfully navigate to the desired position 1308 then an acceptable or GO status is provided to the user. If the lift device will be operating outside of stability thresholds in order to reach the desired position 1308, then an unacceptable or NO-GO status is provided to the user.

In some embodiments, the load map defines operational envelopes. Each operational envelope may include a rated load. For example, the rated load may include a payload or total weight of a target location of the lifting device (e.g., a total weight of occupants and equipment loaded on the platform assembly 1216). In the example shown in FIG. 34, the boom lift 1100 includes a first operational envelop 1470 defining acceptable (i.e., GO) status distance, pitch, and yaw positional information for a first rated load of up to one-thousand pounds (1000 lbs). Desired positions 1308 located outside the first operational envelope 1470 are determined to be unacceptable (i.e. NO-GO) status and the operator is notified to not extend the boom lift 1100 to the desired position 1308. A second operational envelop 1474 defines acceptable (i.e., GO) status distance, pitch, and yaw positional information for a second rated load of up to seven-hundred-fifty pounds (750 lbs). A third operational envelop 1478 defines acceptable (i.e., GO) status distance, pitch, and yaw positional information for a third rated load of up to five-hundred pounds (500 lbs). More than three or less than three operational envelopes can be assigned or determined for each machine or lifting device. Operational envelops generally define a three-dimensional space within which the rated load of a particular machine can operate within stability tolerances.

In operation, the user can utilize the range and position determination system 1300 to identify the desired position 1308. The range and position determination system 1300 also receives rated load information from a machine sensor suite associated with the vehicle 1100 or the lifting device (e.g., stress type sensors, virtual or physical sensors, weight sensing systems, etc.), from sensors of the range and position determination system 1300, or based on user input (e.g., a manually entered payload or rated load via the HMI). The range and position determination system 1300 can then identify the position of the desired position 1308 within the load map using the weight. If the desired position 1308 is located within the operational envelop defined based on the rated load, then the user is provided with an acceptable or a GO notification. If the desired position 1308 is located outside the operational envelop defined based on the rated load, then the user is provided with an unacceptable or a NO-GO notification.

In some embodiments, the range and position determination system 1300 can provide instructions to the user (e.g., via the HMI) for how to position the vehicle 1100 to reach the desired position 1308 or a plurality of desired positions 1308a-c. Instructions can also include steps for manipulating the lifting device (e.g., visual or augmented reality guides). In some embodiments, if an unacceptable or NO-GO notification is presented, the machine, vehicle 1100, or lifting device may inhibit the user from attempting to reach the desired position 1308 before repositioning the machine or vehicle 1100.

In some embodiments, the range and position determination system 1300 includes a database of machines, vehicles 1100, and/or lifting devices and can reference the database to preload calibration settings. The machine specific calibration settings can improve the ability of the range and position determination system 1300 to be installed and to operate consistently across a fleet of vehicles. In some embodiments, a single range and position determination system 1300 could be moved between different vehicles 1100 and utilize preset, and precalibrated settings.

In some embodiments, the range and position determination system 1300 provide application specific functionality. For example, when used with a refuse vehicle (e.g., a front loading or a side loading refuse vehicle) the lifting device can be integrated with range and position determination system 1300. The range and position determination system 1300 may be used to scan a curb for trash cans, or an upcoming trash can may be identified by the user using a handheld aiming unit. The range and position determination system 1300 can then determine if the identified trach can is within the operational envelop of the lifting device and provide an acceptable or unacceptable notification to the user.

Other Exemplary Vehicles

Figure 35:
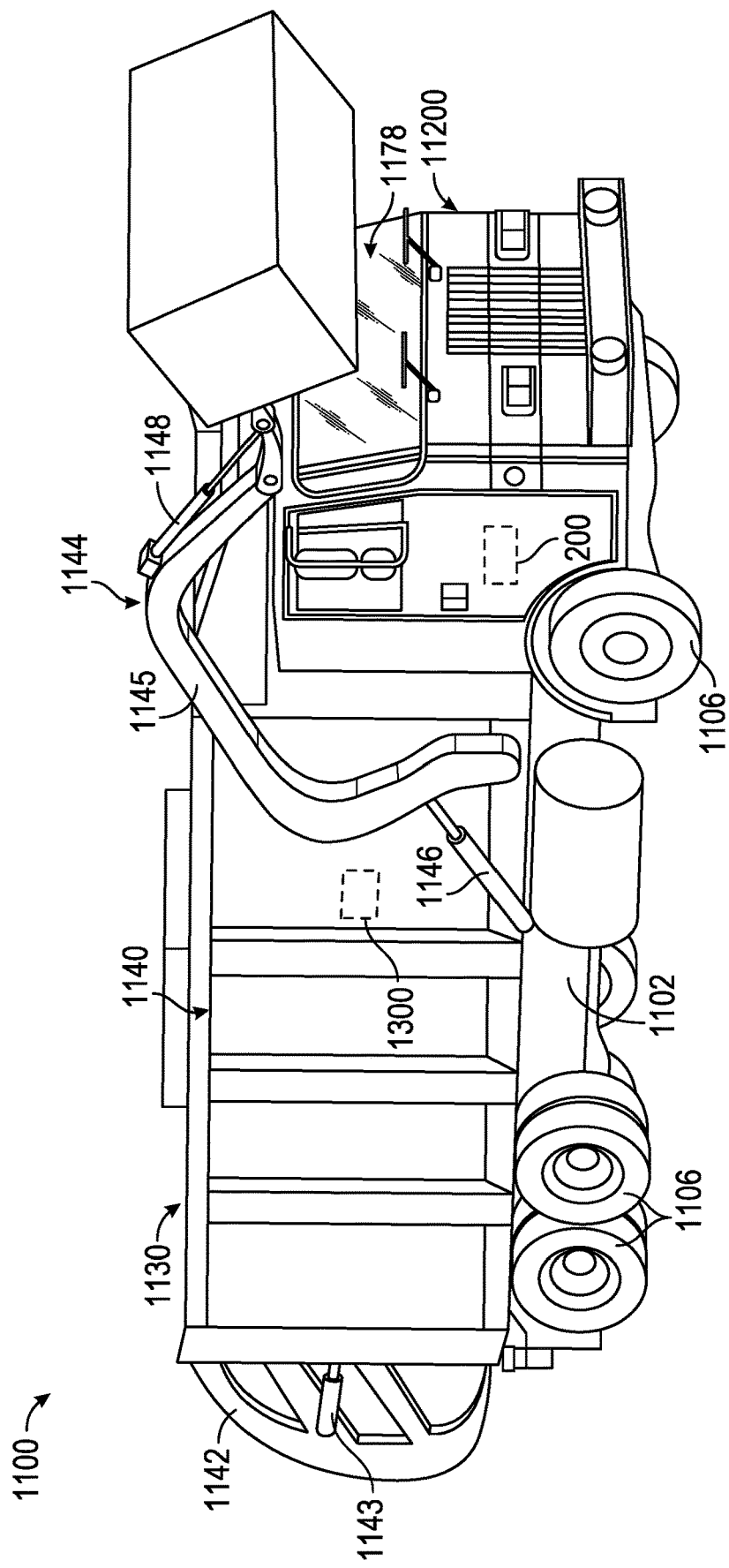
FIG. 35 is a perspective view of a refuse vehicle, according to an exemplary embodiment.

According to the exemplary embodiment shown in FIG. 35, the vehicle 1100 is configured as a front loading refuse vehicle (e.g., a garbage truck, a waste collection truck, a sanitation truck, a recycling truck, etc.). The vehicle 1100 includes a front cabin, shown as cab 1120, coupled to the frame 1102 (e.g., at a front end thereof, etc.) and defining an interior, shown as interior 1178, and a rear assembly, shown as rear assembly 1130, coupled to the frame 1102 (e.g., at a rear end thereof, etc.). The cab 1120 may include various components to facilitate operation of the vehicle 1100 by an operator (e.g., a seat, a steering wheel, hydraulic controls, a user interface, switches, buttons, dials, etc.). In other embodiments, the vehicle 1100 is configured as a side-loading refuse truck or a rear-loading refuse truck. As shown in FIG. 35, the rear assembly 1130 is configured as a rear body, shown as refuse compartment 1140. According to an exemplary embodiment, the refuse compartment 1140 facilitates transporting refuse from various waste receptacles within a municipality to a storage and/or processing facility (e.g., a landfill, an incineration facility, a recycling facility, etc.). By way of example, loose refuse may be placed into the refuse compartment 1140 where it may thereafter be compacted. The refuse compartment 1140 may provide temporary storage for refuse during transport to a waste disposal site and/or a recycling facility. In some embodiments, the refuse compartment 1140 includes a hopper volume and a storage volume. Refuse may be initially loaded into the hopper volume and thereafter compacted into the storage volume. According to an exemplary embodiment, the hopper volume is positioned between the storage volume and the cab 1120 (i.e., refuse is loaded into a position of the refuse compartment 1140 behind the cab 1120 and stored in a position further toward the rear of the refuse compartment 1140). In other embodiments, the storage volume is positioned between the hopper volume and the cab 1120 (e.g., in a rear-loading refuse vehicle, etc.). As shown in FIG. 35, the refuse compartment 1140 includes a pivotable rear portion, shown as tailgate 1142. The tailgate 1142 is pivotally coupled to the refuse compartment 1140 and movable between a closed orientation and an open orientation by actuators, shown as tailgate actuators 1143 (e.g., to facilitate emptying the storage volume, etc.).

As shown in FIG. 35, the vehicle 1100 includes a lift device or lift mechanism/system (e.g., a front-loading lift assembly, etc.), shown as lift assembly 1144 having a pair of lift arms, shown as lift arms 1145, coupled to the frame 1102 and/or the rear assembly 1130 on each side of the vehicle 1100 such that the lift arms 1145 extend forward of the cab 1120 (e.g., a front-loading refuse vehicle, etc.). In other embodiments, the lift assembly 1144 extends rearward of the rear assembly 1130 (e.g., a rear-loading refuse vehicle, etc.). In still other embodiments, the lift assembly 1144 extends from a side of the rear assembly 1130 and/or the cab 1120 (e.g., a side-loading refuse vehicle, etc.). The lift arms 1145 may be rotatably coupled to frame 1102 with a pivot (e.g., a lug, a shaft, etc.). As shown in FIG. 35, the lift assembly 1144 includes actuators (e.g., hydraulic cylinders, etc.), shown as lift arm actuators 1146 and articulation actuators 1148, coupled to the frame 1102 and/or the lift arms 1145. The lift arm actuators 1146 are positioned such that extension and retraction thereof rotates the lift arms 1145 about an axis extending through the pivot, according to an exemplary embodiment. The lift arms 1145 may be rotated by the lift arm actuators 1146 to lift a refuse container over the cab 1120. The articulation actuators 1148 are positioned to articulate the distal ends of the lift arms 1145 coupled to the refuse container to assist in tipping refuse out of the refuse container into the hopper volume of the refuse compartment 1140 (e.g., through an opening in the refuse compartment 1140, etc.). The lift arm actuators 1146 may thereafter rotate the lift arms 1145 to return the empty refuse container to the ground.

Figure 36:
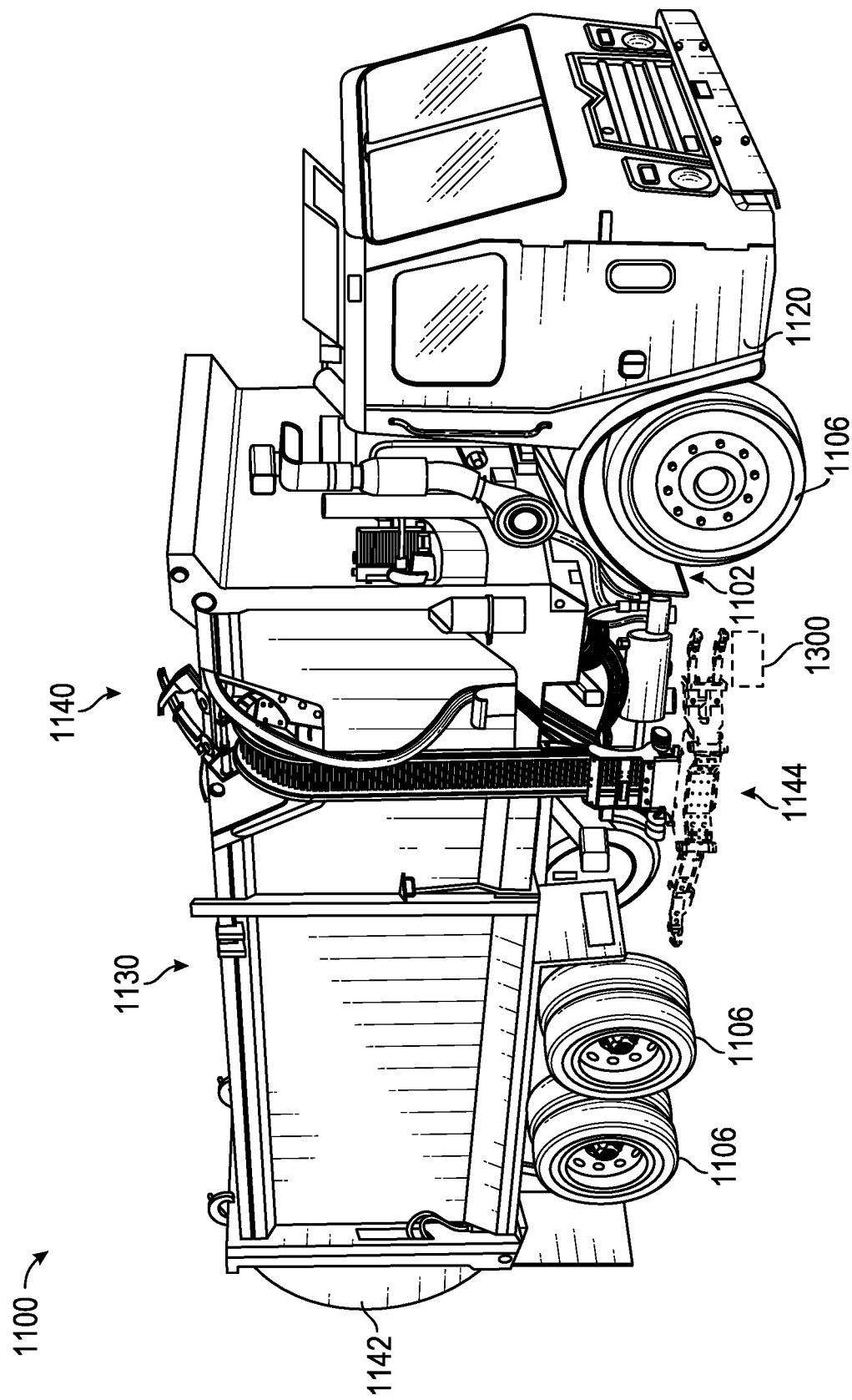
FIG. 36 is a perspective view of a refuse vehicle, according to an exemplary embodiment.

According to the exemplary embodiment shown in FIG. 36, the vehicle 1100 is configured as a side loading refuse vehicle (e.g., a garbage truck, a waste collection truck, a sanitation truck, a recycling truck, etc.) and the lift assembly 1144 is arranged on a side of the refuse truck 1100.

Figure 37:
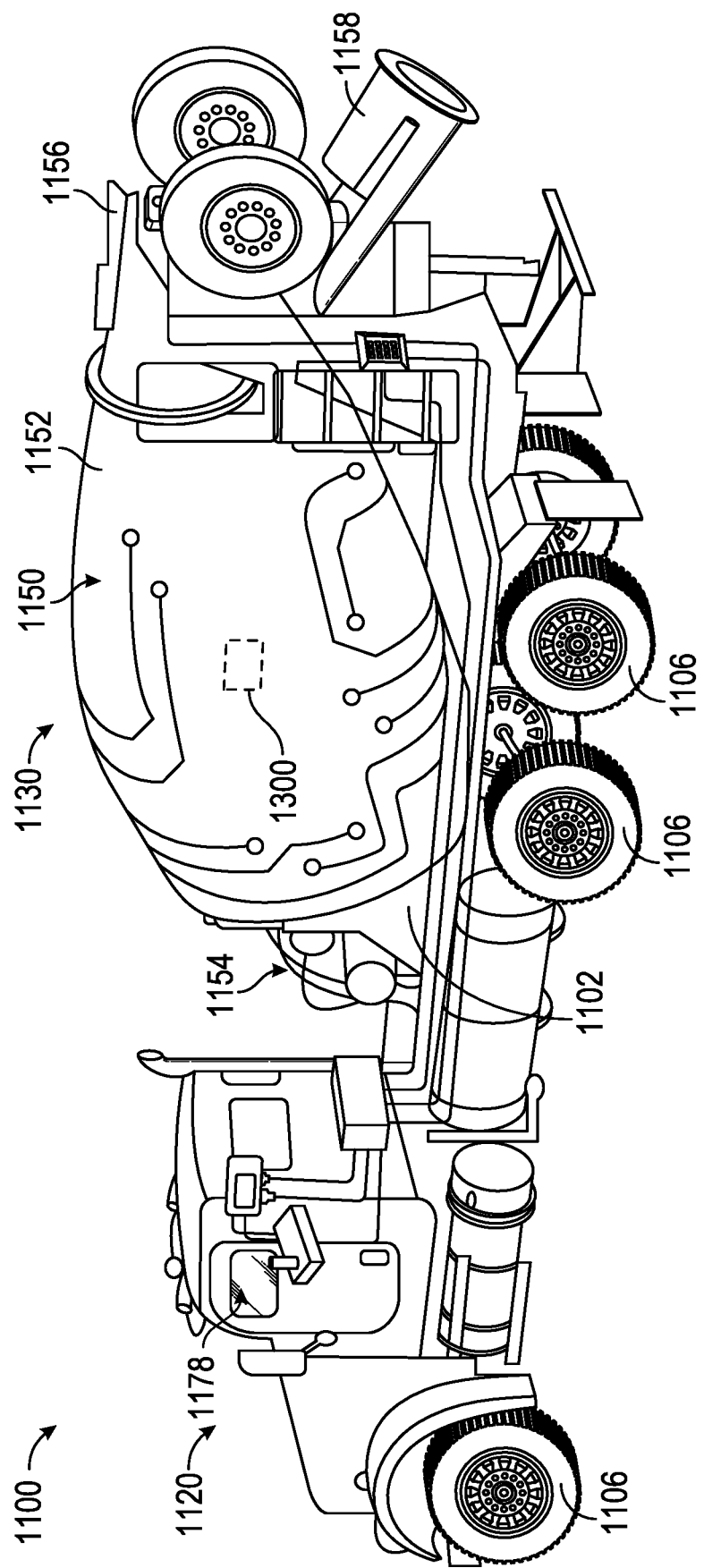
FIG. 37 is a perspective view of a mixer vehicle, according to an exemplary embodiment.

According to the exemplary embodiment shown in FIG. 37, the vehicle 1100 is configured as a concrete mixer truck. As shown in FIG. 37, the rear assembly 1130 of the vehicle 1100 includes a concrete drum assembly, shown as drum assembly 1150. According to an exemplary embodiment, the vehicle 1100 is configured as a rear-discharge concrete mixing truck. In other embodiments, the vehicle 1100 is configured as a front-discharge concrete mixing truck.

As shown in FIG. 37, the drum assembly 1150 of the vehicle 1100 includes a drum, shown as mixing drum 1152. The mixing drum 1152 is coupled to the frame 1102 and disposed behind the cab 1120 (e.g., at a rear and/or middle of the frame 1102, etc.). The drum assembly 1150 includes a drive system, shown as drum drive system 1154, coupled to the frame 1102. According to an exemplary embodiment, the drum drive system 1154 is configured to selectively rotate the mixing drum 1152 about a central, longitudinal axis thereof. In one embodiment, the drum drive system 1154 is driven by a driveline. In other embodiments, the drum drive system 1154 is individually powered, separate from the driveline (e.g., with a motor, an independently driven actuator, etc.). According to an exemplary embodiment, the vehicle 1100 includes a lift device in the form of an actuator positioned to facilitate selectively adjusting the central, longitudinal axis to a desired or target angle (e.g., manually in response to an operator input/command, automatically according to a control scheme, etc.).

As shown in FIG. 37, the mixing drum 1152 of the drum assembly 1150 includes an inlet, shown as hopper 1156, and an outlet, shown as chute 1158. According to an exemplary embodiment, the mixing drum 1152 is configured to receive a mixture, such as a concrete mixture (e.g., cementitious material, aggregate, sand, etc.), with the hopper 1156. The mixing drum 1152 may additionally include an injection port. The injection port may provide access into the interior of the mixing drum 1152 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port includes an injection valve that facilitates injecting the water and/or the chemicals from a fluid reservoir (e.g., a water tank, etc.) into the mixing drum 1152 to interact with the mixture, while preventing the mixture within the mixing drum 1152 from exiting the mixing drum 1152 through the injection port. The mixing drum 1152 may include a mixing element (e.g., fins, etc.) positioned within the interior thereof. The mixing element may be configured to (i) agitate the contents of mixture within the mixing drum 1152 when the mixing drum 1152 is rotated by the drum drive system 1154 in a first direction (e.g., counterclockwise, clockwise, etc.) and (ii) drive the mixture within the mixing drum 1152 out through the chute 1158 when the mixing drum 1152 is rotated by the drum drive system 1154 in an opposing second direction (e.g., clockwise, counterclockwise, etc.). The chute 1158 may include a lifting device in the form of an actuator positioned such that the chute 1158 is selectively pivotable to reposition the chute 1158 (e.g., vertically, laterally, etc.) and, therefore, an angle at which the mixture is expelled from the mixing drum 1152.

Figure 38:
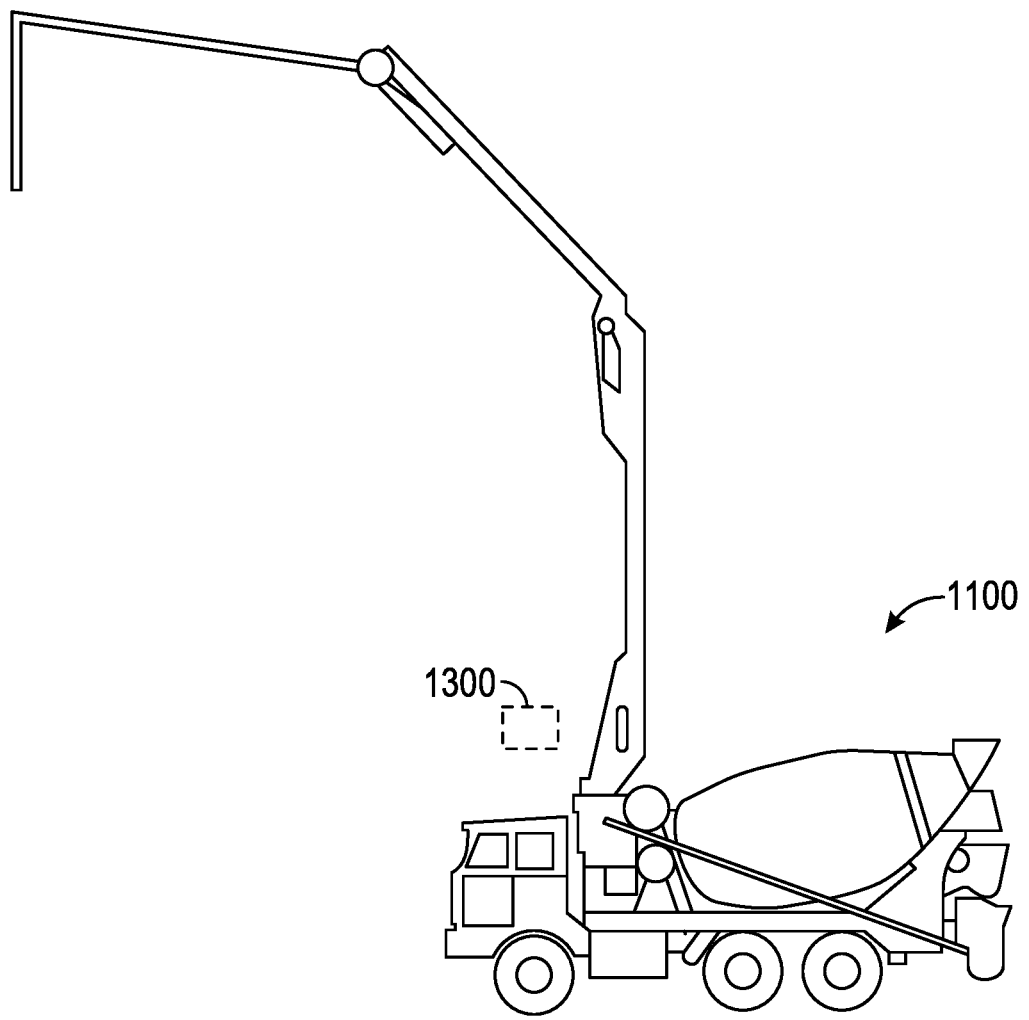
FIG. 38 is a perspective view of a concrete pump vehicle, according to an exemplary embodiment.

According to the exemplary embodiment shown in FIG. 38, the vehicle 1100 is configured as a concrete pump truck and the lift device is a concrete pump tube assembly that is articulable relative to the truck 1100 and the chassis 1102.

Figure 39:
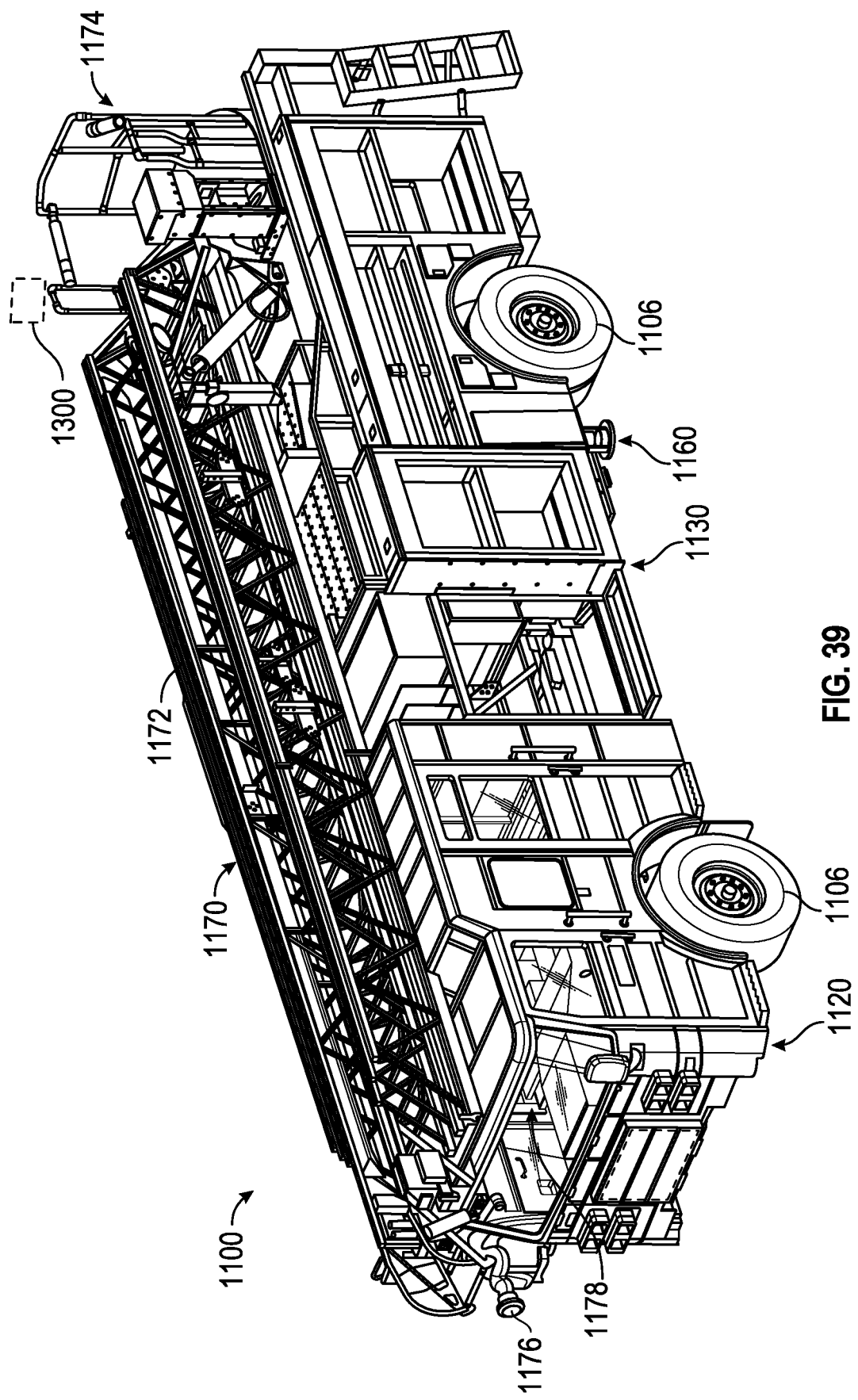
FIG. 39 is a perspective view of a fire fighting vehicle, according to an exemplary embodiment

According to the exemplary embodiment shown in FIG. 39, the vehicle 1100 is configured as response vehicle. As shown in FIG. 39, the response vehicle is a fire apparatus or fire fighting vehicle configured as a rear-mount aerial ladder truck. In another embodiment, the fire apparatus or fire fighting vehicle is configured as a mid-mount aerial ladder truck. In some embodiments, the aerial ladder truck is configured as a quint fire truck (e.g., includes on-board water storage, hose storage, a water pump, etc.). In some embodiments, the aerial ladder truck is configured as a tiller fire truck. In still another embodiment, the fire apparatus or fire apparatus is configured as a pumper fire truck (i.e., does not include an aerial ladder). In other embodiments, the vehicle 1100 is configured as another type of response vehicle. By way of example, the response vehicle may be configured as a police vehicle, an ambulance, a tow truck, and/or still other vehicles used for responding to a scene (e.g., an accident, a fire, an incident, etc.).

As shown in FIG. 39, the rear assembly 1130 includes stabilizers, shown as outriggers 1160, and a lift device or an aerial assembly, shown as ladder assembly 1170. The outriggers 1160 may be selectively extended from each lateral side and/or rear of the rear assembly 1130 to provide increased stability while the vehicle 1100 is stationary and the ladder assembly 1170 is in use (e.g., extended from the vehicle 1100, etc.). The rear assembly 1130 further includes various compartments, cabinets, etc. that may be selectively opened and/or accessed for storage and/or component inspection, maintenance, and/or replacement.

As shown in FIG. 39, the ladder assembly 1170 includes a plurality of ladder sections, shown as ladder sections 1172, that are slidably coupled together such that the ladder sections 1172 are extendable and retractable. The ladder assembly 1170 further includes a base platform, shown as turntable 1174, positioned at the base or proximal end of the ladder sections 1172. The turntable 1174 is configured to rotate about a vertical axis such that the ladder sections 1172 may be selectively pivoted about the vertical axis (e.g., up to 360 degrees, etc.). As shown in FIG. 39, the ladder assembly 1170 includes an implement, shown as water turret 1176, coupled to the distal end of the ladder sections 1172. The water turret 1176 is configured to facilitate expelling water and/or a fire suppressing agent (e.g., foam, etc.) from a water storage tank and/or agent tank onboard the vehicle 1100 and/or from an external water source (e.g., a fire hydrant, a separate water/pumper truck, etc.). In other embodiments, the ladder assembly 1170 does not include the water turret 1176. In such embodiments, the ladder assembly 1170 may include an aerial platform coupled to the distal end of the ladder sections 1172.

Figure 40:
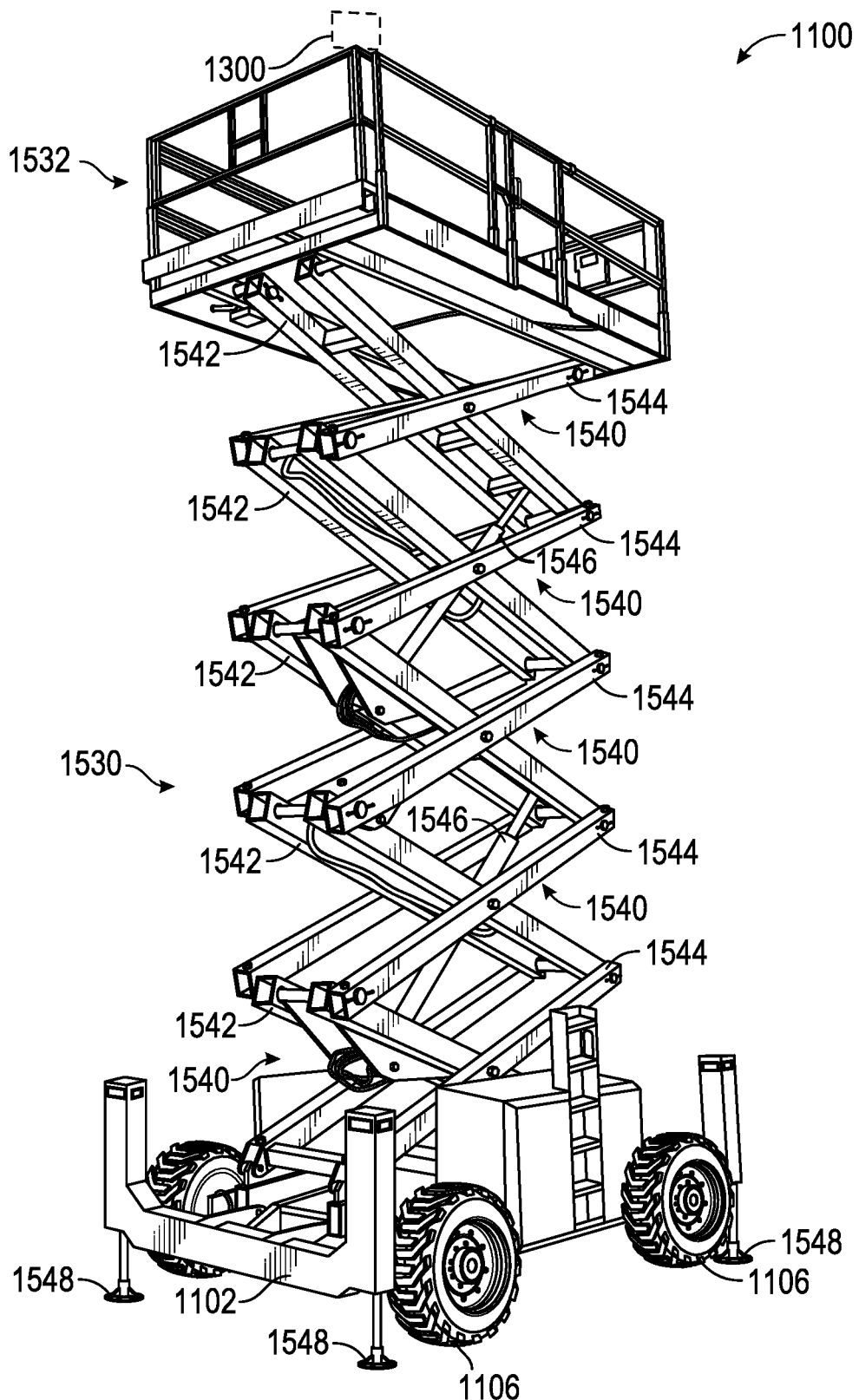
FIG. 40 is a perspective view of a lift machine, according to an exemplary embodiment.

According to the exemplary embodiment shown in FIG. 40, the vehicle 1100 is configured as a scissor lift. As shown in FIG. 40, the vehicle 1100 includes a lift device or lift system (e.g., a scissor assembly, etc.), shown as lift assembly 1530, that couples the frame 1102 to a platform, shown as platform 1532. The frame 1102 supports the lift assembly 1530 and the platform 1532, both of which are disposed directly above the frame 1102. In use, the lift assembly 1530 extends and retracts to raise and lower the platform 1532 relative to the frame 1102 between a lowered position and a raised position.

As shown in FIG. 40, the vehicle 1100 includes one or more actuators, shown as leveling actuators 1548, coupled to each corner of the frame 1102. According to an exemplary embodiment, the leveling actuators 1548 extend and retract vertically between a stored position and a deployed position. In the stored position, the leveling actuators 1548 are raised and do not contact the ground. In the deployed position, the leveling actuators 1548 contact the ground, lifting the frame 1102. The length of each of the leveling actuators 1548 in their respective deployed positions may be varied to adjust the pitch (i.e., rotational position about a lateral axis) and the roll (i.e., rotational position about a longitudinal axis) of the frame 1102. Accordingly, the lengths of the leveling actuators 1548 in their respective deployed positions may be adjusted such that the frame 1102 is leveled with respect to the direction of gravity, even on uneven or sloped terrains. The leveling actuators 1548 may additionally lift the wheel and tire assemblies 1106 off the ground, preventing inadvertent driving of the vehicle 1100. In other embodiments, the vehicle 1100 does not include the leveling actuators 1548.

As shown in FIG. 40, the lift assembly 1530 includes a number of subassemblies, shown as scissor layers 1540. Each of the scissor layers 1540 includes a first member, shown as inner member 1542, and a second member, shown as outer member 1544. In each scissor layer 1540, the outer member 1544 receives the inner member 1542. The inner member 1542 is pivotally coupled to the outer member 1544 near the centers of both the inner member 1542 and the outer member 1544. Accordingly, the inner members 1542 pivot relative to the outer members 1544 about a lateral axis. The scissor layers 1540 are stacked atop one another to form the lift assembly 1530. Each inner member 1542 and each outer member 1544 has a top end and a bottom end. The bottom end of each inner member 1542 is pivotally coupled to the top end of the outer member 1544 immediately below it, and the bottom end of each outer member 1544 is pivotally coupled to the top end of the inner member 1542 immediately below it. Accordingly, each of the scissor layers 1540 is coupled to one another such that movement of one scissor layer 1540 causes a similar movement in all of the other scissor layers 1540. The bottom ends of the inner member 1542 and the outer member 1544 belonging to the lowermost of the scissor layers 1540 are coupled to the frame 1102. The top ends of the inner member 1542 and the outer member 1544 belonging to the uppermost of the scissor layers 1540 are coupled to the platform 1532. Scissor layers 1540 may be added to or removed from the lift assembly 1530 to increase or decrease, respectively, the maximum height that the platform 1532 is configured to reach.

As shown in FIG. 40, the lift assembly 1530 includes one or more actuators (e.g., hydraulic cylinders, pneumatic cylinders, motor-driven leadscrews, etc.), shown as lift actuators 1546, that are configured to extend and retract the lift assembly 1530. The lift actuators 1546 are pivotally coupled to an inner member 1542 at one end and pivotally coupled to another inner member 1542 at the opposite end. These inner members 1542 belong to a first scissor layer 1540 and a second scissor layer 1540 that are separated by a third scissor layer 1540. In other embodiments, the lift assembly 1530 includes more or fewer lift actuators 1546 and/or the lift actuators 1546 are otherwise arranged. The lift actuators 1546 are configured to actuate the lift assembly 1530 to selectively reposition the platform 1532 between the lowered position where the platform 1532 is proximate the frame 1102 and the raised position where the platform 1532 is at an elevated height. In some embodiments, extension of the lift actuators 1546 moves the platform 1532 vertically upward (extending the lift assembly 1530), and retraction of the linear actuators moves the platform 1532 vertically downward (retracting the lift assembly 1530). In other embodiments, extension of the lift actuators 1546 retracts the lift assembly 1530, and retraction of the lift actuators 1546 extends the lift assembly 1530. In some embodiments, the outer members 1544 are approximately parallel and/or contacting one another when with the lift assembly 1530 in a stored position. The vehicle 1100 may include various components to drive the lift actuators 1546 (e.g., pumps, valves, compressors, motors, batteries, voltage regulators, etc.).

Figure 41:
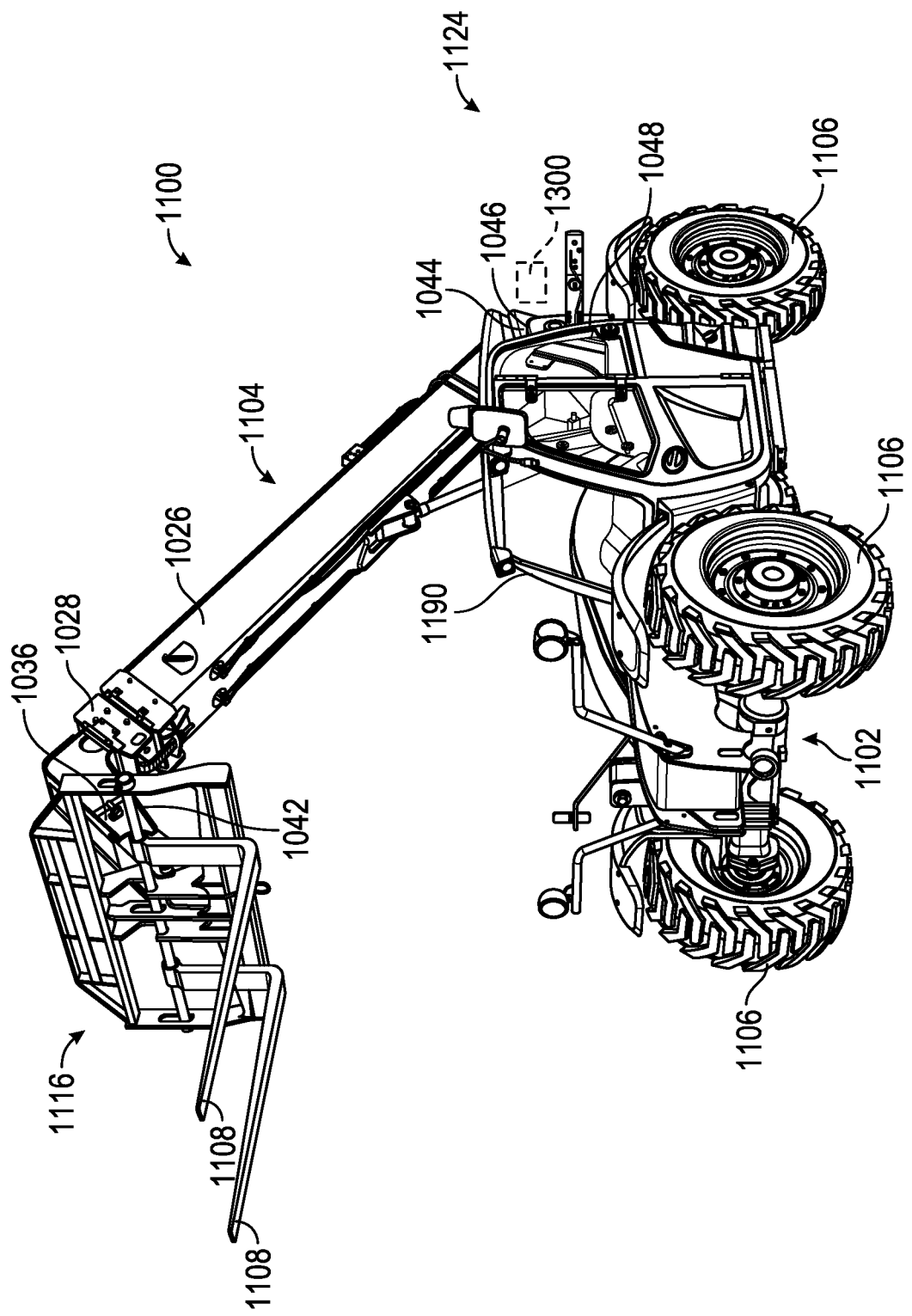
FIG. 41 is a perspective view of a scissor lift vehicle, according to an exemplary embodiment.

Referring particularly to FIG. 41, a lift device, a boom, an articulated boom, a lift, a MEWP, a telehandler, etc., shown as lift device 1100 includes a base assembly 1124 (e.g., a base, a main body, a vehicle, etc.), a lift apparatus 1104 (e.g., a telescoping arm, an articulated arm, a boom arm, a boom, etc.), and an implement assembly 1116 (e.g., a platform, a platform assembly, a work platform, a fork assembly, an apparatus, etc.). As shown in FIG. 41, lift device 1100 is provided as a mobile elevated work platform (MEWP) where the implement assembly 1116 is a work platform. Implement assembly 1116 may be replaceable with different implement assemblies (e.g., a fork assembly) to transition the lift device 1100 from being a MEWP to being a material handler (MH). When lift device 1100 is a MH, implement assembly 1116 can be a fork carriage that may serve as a versatile attachment interface where a work platform designed with forklift pockets can be attached, a pair of forks for material handliner, etc. Additionally, the fork carriage can be used for other tool attachments so that the implement assembly 1116 is interchangeable.

Base assembly 1124 includes frame 1102 (e.g., a carriage, a structural member, a support member, a chassis, a frame member, etc.,), and multiple tractive elements 1106 (e.g., wheels, treads, rotatable members, rollers, etc.). Base assembly 1124 also includes a primary mover (e.g., an electric motor, an internal combustion engine, a hydraulic motor, a pneumatic motor, etc.), shown as an electric motor. Tractive elements 1106 can receive the mechanical power from the electric motor and rotate relative to frame 1102. Tractive elements 1106 can each be pivotally or rotatably coupled with frame 1102 so that tractive elements 1106 can rotate relative to frame 1102 to facilitate a driving or transport operation of lift device 1100 (e.g., to transport lift device 1100 from one jobsite to another jobsite).

Referring still to FIG. 41, base assembly 1124 includes an operator station, shown as deployable operator station 1190 (e.g., a cab, a housing, an enclosure, a space, a zone, a station, a standing station, a platform, etc.). Deployable operator station 1190 can be fixedly coupled with frame 1102 or a body of lift device 1100 so that an operator may sit or stand at deployable operator station 1190 and be transported with lift device 1100 as lift device 1100 drives and steers. Deployable operator station 1190 can include a body, a frame, sidewalls, a roof, doors, windows, etc., or may otherwise form an enclosure for the operator. Deployable operator station 1190 can be positioned on a left side or a right side of lift device 1100, or may be centered above frame 1102. In some embodiments, deployable operator station 1190 is deployable or transitionable between an un-deployed state, position, mode, etc., and a deployed state, position, mode, etc. Deployable operator station 1190 may be a complete or a partial enclosure that provides protection for the operator or shielding from environmental elements.

Referring still to FIG. 41, lift apparatus 1104 is or includes a pair of articulated telescoping members, shown as an outer member 1026 (e.g., a first member) and an inner member 1028. Inner member 1028 can be received within an inner volume of outer member 1026 and may be configured to slide, translate, etc., relative to outer member 1026. In some embodiments, inner member 1028 and outer member 1026 are slidably coupled so that an overall length of the telescoping members can be increased or decreased to facilitate raising or lowering implement assembly 1116. Inner member 1028 and outer member 1026 may be configured to extend or retract through operation of a primary mover, a linear electric actuator, an electric motor, a hydraulic cylinder, a pneumatic cylinder, etc., shown as a linear electric actuator. Outer member 1026 can receive inner member 1028 through a first or proximate end and may be rotatably or hingedly coupled with an intermediate member 1044 at a second or opposite end. Specifically, outer member 1026 may be hingedly or rotatably coupled with an upper portion or corner of intermediate member 1044. Outer member 1026 can be driven to rotate or pivot relative to intermediate member 1044 to raise or lower implement assembly 1116 by a linear actuator, an electric motor, a linear electric actuator, a pneumatic actuator, a hydraulic cylinder, etc., shown as a linear electric actuator.

Lift apparatus 1104 can include an intermediate member, an elongated member, etc., shown as medial member 1036. Medial member 1036 can be pivotally coupled with inner member 1028 through a hinge, a pin, a hinged coupling, etc. Inner member 1028 may extend into an inner volume of outer member 1026 at a first end and rotatably couple with medial member 1036 at an opposite or second end. Medial member 1036 can be configured to be driven to rotate about the pin to pivot or rotate implement assembly 1116 through a linear electric actuator 1042. Linear electric actuator 1042 may be pivotally coupled at a first end with medial member 1036 and pivotally coupled at a second end with inner member 1028 so that extension or retraction of linear electric actuator 1042 drives rotation of medial member 1036 and implement assembly 1116 about the pin relative to inner member 1028.

The lift device 1100 is shown in a material handler mode where implement assembly 1116 include a pair of elongated members, shown as forks 1118. Implement assembly 1116 can be fixedly coupled with medial member 1036 of lift apparatus 1104 so that implement assembly 1116 is raised or lowered through operation of lift apparatus 1104. Implement assembly 1116 may also include a bucket, a platform (e.g., an aerial work platform as shown in FIG. 11), a drill, an auger, etc., or any other equipment.

Figure 42:
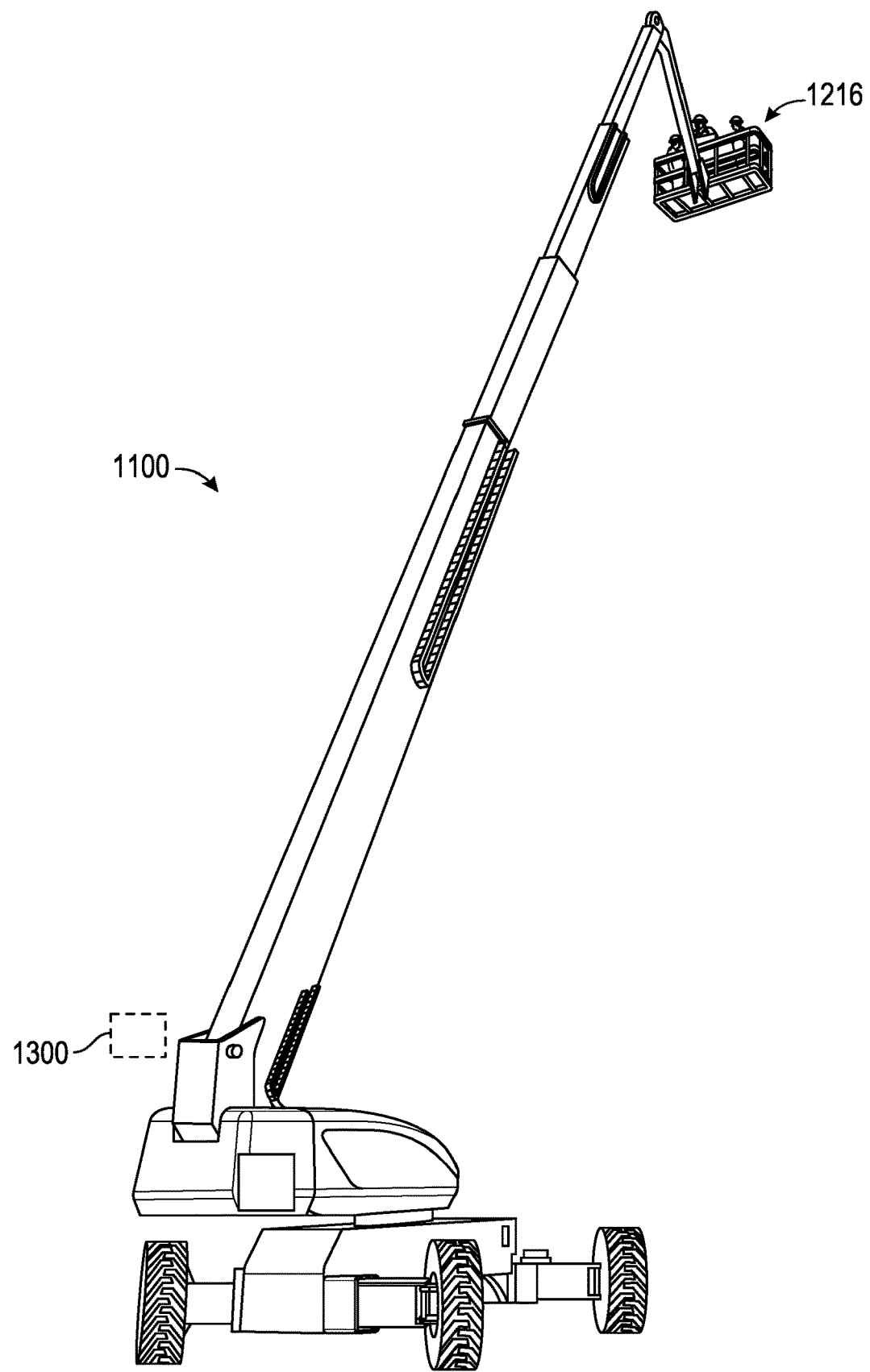
FIG. 42 is a perspective view of an ultra boom lift, according to an exemplary embodiment.

According to the exemplary embodiment shown in FIG. 42, the vehicle 1100 is configured as an ultra boom lift capable of carrying the platform assembly 1216 to high heights and reaches (e.g., 185 feet).

While various types of vehicle have been described herein with respect to FIGS. 35-42, it should be understood that the present disclosure similarly applies to other types of vehicles and lifting devices. For example, the vehicle 1100 may be a military vehicle, a delivery vehicle, a mail vehicle, a boom truck, a plow truck, a farming machine or vehicle, a construction machine or vehicle, a bus, a semi-truck, a passenger or work vehicle (e.g., a sedan, a SUV, a truck, a van, etc.), and/or still another vehicle that includes a lift device.

Each of the vehicles 1100 discussed above are equipped with a range and position determination system 1300 that is structured to define range and position limits and thresholds of the lift device, monitor a current position of the lift device, receive a desired position via user input, receive a payload input, and determine if the desired position is acceptable or unacceptable. Two exemplary range and position determination systems 1300 are discussed above. Other range and position determination systems and implementations are considered within the scope of this disclosure.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A reach and placement tool comprising:
an eyepiece;
an orientation sensor;
a distance sensor;
a display screen separate from the eyepiece; and
a controller configured to:
obtain a distance value and an orientation from the distance sensor and the orientation sensor when the reach and placement tool is directed towards a point of interest at a particular location;
determine a coordinate of the point of interest using the distance value and the orientation;
determine, based on a comparison between the coordinate of the point of interest and a plurality of different reach envelopes, which of a plurality of different reach apparatuses can reach the point of interest, the plurality of different reach apparatuses corresponding to one of the plurality of different reach envelopes; and
operate the display screen to notify a user regarding which of the plurality of different reach apparatuses can reach the point of interest;

wherein the reach and placement tool is a handheld device configured to be held by the user and directed towards the point of interest while the eyepiece is held to an eye of the user to obtain the distance value and the orientation; and wherein the reach and placement tool is configured to determine which of the plurality of different reach apparatuses can reach the point of interest without requiring a reach apparatus to be at a jobsite of the point of interest.

2. The reach and placement tool of claim 1, wherein the controller is further configured to:

operate the display screen to notify the user that the point of interest is within range of a particular reach apparatus or that the point of interest is not within range of the particular reach apparatus.

3. The reach and placement tool of claim 1, wherein the distance value is a distance between the reach and placement tool at the particular location and the point of interest.

4. The reach and placement tool of claim 1, wherein the orientation obtained from the orientation sensor comprises a plurality of angle values.

5. The reach and placement tool of claim 1, wherein the plurality of different reach envelopes are scaled absolute reach envelopes.

6. A method for notifying a user if one or more points of interest are within reach of a reach apparatus, the method comprising:

obtaining a distance value and an orientation from a distance sensor and an orientation sensor when a handheld unit comprising both the distance sensor and the orientation sensor is directed towards a point of interest at a particular location;

determining a coordinate of the point of interest using the distance value and the orientation;

determining, based on a comparison between the coordinate of the point of interest and a plurality of different reach envelopes, which of a plurality of different reach apparatuses can reach the point of interest, the plurality of different reach apparatuses corresponding to one of the plurality of different reach envelopes; and operating a display screen of the handheld unit to notify the user that the point of interest is within range of a particular reach apparatus or that the point of interest is not within range of the particular reach apparatus;

wherein the handheld unit is configured to determine which of the plurality of different reach apparatuses can reach the point of interest without requiring a reach apparatus to be at a jobsite of the point of interest.

7. The method of claim 6, further comprising:

repeating the steps of obtaining the distance value and the orientation from the distance sensor and the orientation sensor, determining the coordinate of the point of interest, and comparing the coordinate of the point of interest to the plurality of different reach envelopes for an additional point of interest to determine if the additional point of interest is within range of the particular reach apparatus.

8. The method of claim 6, further comprising:

operating a display screen of a personal computer device to notify the user that the point of interest is within range of a particular reach apparatus or that the point of interest is not within range of the particular reach apparatus; or operating a display screen of the particular reach apparatus to notify the user that the point of interest is within range of a particular reach apparatus or that the point of interest is not within range of the particular reach apparatus.

9. The method of claim 6, wherein obtaining the distance value and the orientation from the distance sensor and the orientation sensor, determining the coordinate of the point of interest, and comparing the coordinate of the point of interest to the plurality of different reach envelopes are performed by processing circuitry located at the handheld unit.

10. The method of claim 6, wherein:

obtaining the distance value and the orientation from the distance sensor and the orientation sensor is performed by processing circuitry located locally at the handheld unit;

determining the coordinate of the point of interest, and comparing the coordinate of the point of interest to the plurality of different reach envelopes are performed by processing circuitry of a mobile device; and wherein the method further comprises:
wirelessly transmitting the distance value and the orientation from the processing circuitry located locally at the handheld unit to the processing circuitry of the mobile device.

11. The method of claim 6, wherein:

obtaining the distance value and the orientation from the distance sensor and the orientation sensor is performed by processing circuitry located locally at the handheld unit;

determining the coordinate of the point of interest, and comparing the coordinate of the point of interest to the plurality of different reach envelopes are performed by processing circuitry of the particular reach apparatus; and wherein the method further comprises:
wirelessly transmitting the distance value and the orientation from the processing circuitry located locally at the handheld unit to the processing circuitry of the particular reach apparatus.

12. The method of claim 6, wherein:

obtaining the distance value and the orientation from the distance sensor and the orientation sensor is performed by processing circuitry located locally at the handheld unit;

determining the coordinate of the point of interest, and comparing the coordinate of the point of interest to the plurality of different reach envelopes are performed by processing circuitry of a remote system; and wherein the method further comprises:
wirelessly transmitting the distance value and the orientation from the processing circuitry located locally at the handheld unit to the processing circuitry of the remote system.

13. The method of claim 6, wherein the distance value is a distance between the handheld unit at the particular location and the point of interest.

14. The method of claim 6, wherein the plurality of different reach envelopes are scaled absolute reach envelopes.

15. A system for determining if a point of interest is within reach of a reach apparatus, the system comprising:

a handheld unit comprising an orientation sensor and a distance sensor configured to obtain a distance value and an orientation when the handheld unit is directed towards a point of interest at a particular location by a user;

processing circuitry in communication with the orientation sensor and the distance sensor, wherein the processing circuitry is configured to:
  obtain the distance value and the orientation from the distance sensor and the orientation sensor;
  determine a coordinate of the point of interest using the distance value and the orientation;
  determine, based on a comparison between the coordinate of the point of interest and a plurality of different reach envelopes, which of a plurality of different reach apparatuses can reach the point of interest, the plurality of different reach apparatuses corresponding to one of the plurality of different reach envelopes; and
  operate a display screen of the handheld unit to provide feedback regarding which of the plurality of different reach apparatuses can reach the point of interest that is measured at the handheld unit;
wherein the handheld unit is configured to determine which of the plurality of different reach apparatuses can reach the point of interest without requiring a reach apparatus to be at a jobsite of the point of interest.

16. The system of claim 15, wherein the processing circuitry is further configured to operate a display screen that is located at a mobile device, or located at a reach apparatus regarding which of the plurality of different reach apparatuses can reach the point of interest.

17. The system of claim 15, wherein the processing circuitry is located in either a mobile device, a remote system, or at a reach apparatus, wherein the handheld unit further comprises a controller and a wireless transceiver configured to wirelessly transmit the distance value and the orientation from the handheld unit to the processing circuitry.

18. The system of claim 15, wherein the distance value is a distance between the handheld unit at the particular location and the point of interest.

19. The system of claim 15, wherein the orientation obtained from the orientation sensor comprises a plurality of angle values.

* * * * *